(12) United States Patent
Alaniz et al.

(10) Patent No.: US 7,836,092 B2
(45) Date of Patent: Nov. 16, 2010

(54) SYSTEMS, METHODS, AND COMPUTER-READABLE MEDIA FOR PROVIDING INFORMATION REGARDING COMMUNICATION SYSTEMS

(75) Inventors: David Alaniz, Tucker, GA (US); Shawn Roseland, Dacula, GA (US); Richard Amos, Acworth, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 407 days.

(21) Appl. No.: 11/609,731

(22) Filed: Dec. 12, 2006

(65) Prior Publication Data

US 2008/0195694 A1      Aug. 14, 2008

Related U.S. Application Data

(60) Provisional application No. 60/800,097, filed on May 12, 2006.

(51) Int. Cl.
G06F 17/30         (2006.01)

(52) U.S. Cl. ............. 707/802; 370/229; 370/241; 455/418; 455/419; 455/423

(58) Field of Classification Search .......... 707/609, 707/705, 769, 802; 370/229, 241; 455/418, 455/419, 423; 709/224; 714/4, 26, 27, 43
See application file for complete search history.

(56) References Cited

U.S. PATENT DOCUMENTS

| 6,226,674 | B1 | 5/2001 | Klish |
| 6,357,017 | B1 | 3/2002 | Bereiter et al. ............. 714/27 |
| 6,684,213 | B1 * | 1/2004 | Schell et al. ................. 1/1 |
| 6,795,703 | B2 * | 9/2004 | Takae et al. ............... 455/418 |
| 7,092,707 | B2 | 8/2006 | Lau et al. ................. 455/423 |
| 7,281,040 | B1 * | 10/2007 | Ly ........................... 709/224 |
| 2002/0116721 | A1 | 8/2002 | Dobes et al. |
| 2003/0069848 | A1 | 4/2003 | Larson et al. |
| 2003/0149919 | A1 | 8/2003 | Greenwald et al. |
| 2005/0144279 | A1 | 6/2005 | Wexelblat |
| 2006/0100980 | A1 * | 5/2006 | Reed et al. ............... 707/1 |
| 2006/0149992 | A1 | 7/2006 | Shima |

(Continued)

OTHER PUBLICATIONS

U.S. Appl. No. 11/609,640, filed Dec. 12, 2006, entitled, "Methods, Systems and Computer-Readable Media for Assisting in Troubleshooting."

(Continued)

*Primary Examiner*—Fred I Ehichioya
(74) *Attorney, Agent, or Firm*—Hope Baldauff Hartman, LLC

(57) ABSTRACT

Methods, systems, and computer-readable media for accessing information regarding a communication system from a plurality of information sources and providing a consolidated view of the information are provided. A first request to access information regarding the communication system is received. In response to receiving the first request, the information regarding the communication system is retrieved from a plurality of information systems, and a portion of the information retrieved from a first information system of the plurality of information systems is displayed. A second request is received to access a portion of the information retrieved from a second information system of the plurality of information systems including promotional information associated with the communication system. In response to receiving the second request, the portion of the information retrieved from the second information system of the plurality of information systems is displayed.

17 Claims, 20 Drawing Sheets

U.S. PATENT DOCUMENTS

| | | |
|---|---|---|
| 2006/0198310 A1 | 9/2006 | Stieglitz et al. .............. 370/241 |
| 2006/0236395 A1 | 10/2006 | Barker et al. |
| 2006/0248522 A1 | 11/2006 | Lakshminarayanan et al. |
| 2006/0282704 A1 | 12/2006 | Morgan et al. ................. 714/26 |
| 2007/0076605 A1 | 4/2007 | Cidon et al. ................. 370/230 |
| 2007/0248019 A1 | 10/2007 | Feng et al. |
| 2007/0260448 A1 | 11/2007 | Lorenzen et al. |
| 2008/0065760 A1 | 3/2008 | Damm et al. ............... 709/224 |
| 2008/0104165 A1 | 5/2008 | Lo et al. |
| 2009/0003223 A1 | 1/2009 | McCallum et al. |
| 2009/0100172 A1 | 4/2009 | Chen et al. .................. 709/224 |
| 2009/0287432 A1 | 11/2009 | Fausak et al. |

OTHER PUBLICATIONS

U.S. Official Action dated Jun. 9, 2009 in U.S. Appl. No. 11/609,640.
U.S. Official Action dated Dec. 22, 2009 in U.S. Appl. No. 11/609,640.

* cited by examiner

SYSTEMS, METHODS, AND COMPUTER-READABLE MEDIA FOR PROVIDING INFORMATION REGARDING COMMUNICATION SYSTEMS

CROSS REFERENCE TO RELATED APPLICATIONS

The present application claims priority under 35 U.S.C. §119 to co-pending U.S. provisional application No. 60/800,097 entitled "Systems, Methods, and Computer-Readable Media for Analyzing Communication Problems" filed on May 12, 2006, and which is expressly incorporated in its entirety herein by reference.

TECHNICAL FIELD

The present invention is related to providing information regarding communication systems. More particular, the present invention relates to retrieving information regarding a communication system from a plurality of information sources and providing a consolidated view of the retrieved information.

BACKGROUND

Users of technical devices, such as computers and computer-related systems, often experience technical or operating issues related to those systems which require assistance in identifying the issues as well as a solution to the issues. Often, computers and computer-related systems are supported by people having technical knowledge and training in assisting customers with questions and issues associated with the systems or related applications. In such situations, the customer of the system may contact such a technical-support person who, with input from the customer, may answer the customer's questions and recognize and help solve the system problems.

In order to get a complete picture of a customer and a communication system associated with the customer, technical-support persons often have to access a plurality of systems and databases, one by one, to review information provided by the systems and databases about the customer and the associated communication system. Typically, such systems and databases provide myriad amounts of information related to a customer and a communication system associated with the customer. In order to find the information needed to assist in handling customer questions and issues related to the communication system, the technical-support person may be required to access each system and database, in turn, and filter through all the information associated with the customer and/or the communication system that is provided by each of the systems and databases. Moreover, each of the information systems may require verification information, such as a user name and a password, from the technical-support person in order to access and retrieve information stored therein. Searching through a multitude of information scattered throughout a plurality of systems and databases, each of which requires validation of verification information before allowing access, can be a difficult and time-consuming task for a technical-support person and can inevitably contribute to the technician providing poor customer service by incorrectly answering customer questions and misdiagnosing communication system issues. If the technician can more efficiently access and review information needed to assist in handling customer questions and issues related to the customer and a communication system associated with the customer, both the technician and the customer may avoid wasteful and time-consuming efforts in solving questions and issues.

SUMMARY OF THE INVENTION

In accordance with the present invention, the above and other problems are solved by providing methods, systems, and computer-readable media for accessing information regarding a communication system from a plurality of information sources and providing a consolidated view of the information. According to one aspect of the present invention, a method is provided for providing information regarding a communication system. The method involves receiving a first request to access information regarding the communication system. In response to receiving the first request, the information regarding the communication system is retrieved from a plurality of information systems, and a portion of the information retrieved from a first information system of the plurality of information systems is displayed. A second request is received to access a portion of the information retrieved from a second information system of the plurality of information systems including promotional information associated with the communication system. In response to receiving the second request, the portion of the information retrieved from the second information system of the plurality of information systems is displayed.

According to another aspect of the present invention, a computer-readable medium is provided having computer-executable instructions stored thereon which, when executed by a computer, cause the computer to receive a first request to access information regarding the communication system. In response to receiving the first request, a first portion of the information regarding the communication system is retrieved from a first information system and displayed. A second request to access a second portion of the information regarding the communication system including promotional information associated with the communication system is received. In response to receiving the second request, the second portion of the information regarding the communication system is retrieved from a second information system and displayed.

According to yet another aspect of the present invention, a system for providing information regarding a communication system is provided. The system includes a memory device for storing a program for assisting in providing information regarding a communication system, and a processor functionally coupled to the memory device and responsive to instructions contained in the program. The program is operative to receive a first request to access information regarding the communication system. In response to receiving the first request, the information regarding the communication system is retrieved from a plurality of information systems, and a portion of the information retrieved from a first information system of the plurality of information systems is displayed. A second request is received to access a portion of the information retrieved from a second information system of the plurality of information systems including promotional information associated with the communication system. In response to receiving the second request, the portion of the information retrieved from the second information system of the plurality of information systems is displayed.

The above-described aspects of the invention may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
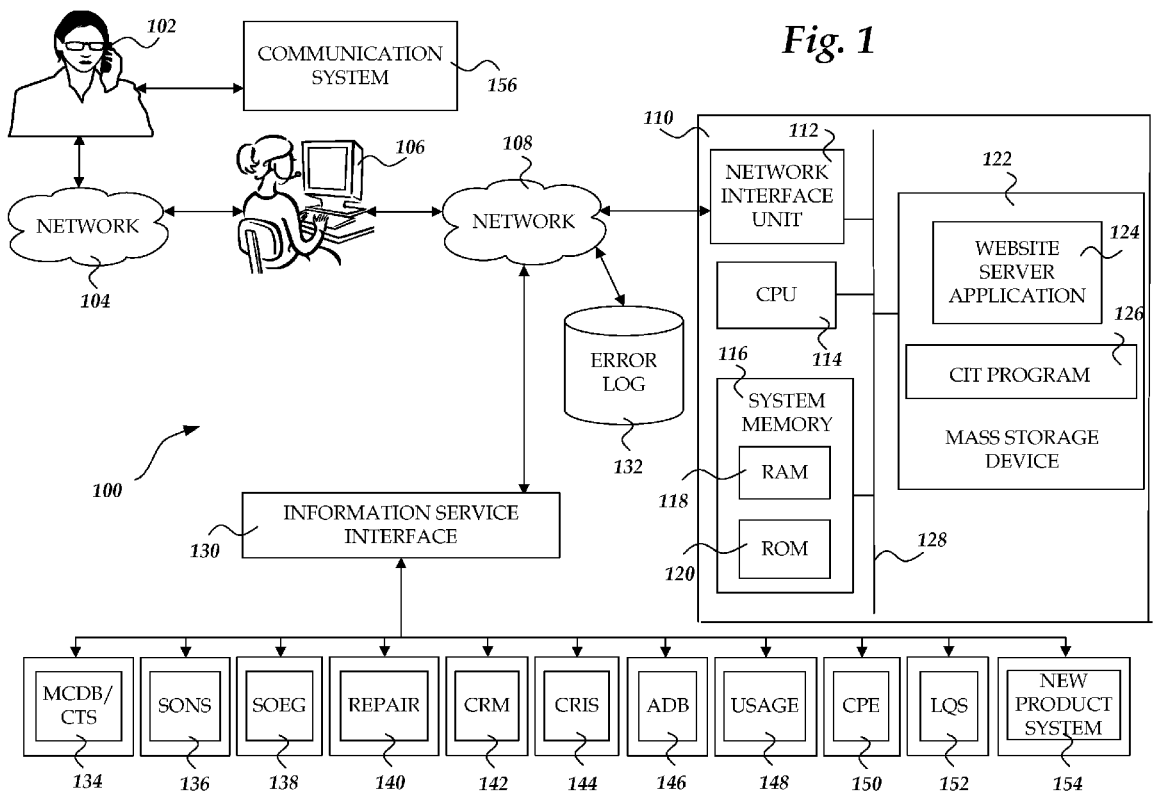
FIG. 1 illustrates a network operating environment utilized in various embodiments of the present invention.

Embodiments of the present invention provide methods, systems, apparatus, and computer-readable media for accessing information regarding a communication system from a plurality of information sources and providing a consolidated view of the information. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with an application program that runs on an operating system on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative operating environment 100 for practicing the various embodiments of the present invention will now be described. In particular, a customer may use a communication device 102 to contact and communicate with a customer support technician at a workstation 106 to assist in answering customer questions regarding a communication system 156 associated with the customer as well as identifying and solving one or more problems the customer may be experiencing with the communication system 156. According to embodiments of the present invention, the communication system 156 may include a communication device such as, but not limited to, a cellular telephone, a wireline telephone, a Voice over Internet Protocol ("VoIP") telephone, a WI-FI telephone, a WiMAX telephone, or a personal data assistant ("PDA"); a computing device such as, but not limited to, a general purpose desktop computer, a laptop computer, a hand-held computer, or any other device capable of executing one or more application programs; or an entertainment device such as, but not limited to a television or a digital video recorder ("DVR"). The communication system 156 may also include one or more networks providing services to the communication, computing, and/or entertainment device including, but not limited to, a cellular network, a public switched telephone network ("PSTN"), an integrated services digital network ("ISDN"), a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, a wired Wide Area Network ("WAN") such as the Internet, a wired ("Local Area Network") LAN such as the Ethernet, a wired Personal Area Network ("PAN"), a wired Metropolitan Area Network ("MAN"), satellite network, a cable network, or any combination thereof. For example, a customer may contact a customer support technician to report that the customer is not able to access the Internet using her desktop computer.

The communication device 102 used to communicate with a customer support technician may include any device capable of sending and receiving communications including, but not limited to, a cellular telephone, a Plain Old Telephone Service ("POTS") telephone, a VoIP telephone, a WI-FI telephone, a WiMAX telephone, a computer, or a PDA. The technician may receive a communication from the customer using a device similar to the communication device 102. The communication between the customer and the customer support technician may occur through a telephone call, email correspondence, text messages, instant messages, or any other form of communication.

According to an embodiment of the present invention, the communication device 102 and the device used by the customer support technician to communicate with the customer may be associated with a network 104 such that communications provided by the communication device of the customer is sent via the network to the communication device used by the technician, and vice versa. The network 104 may include a wireless network such as, but not limited to, a WLAN such as a WI-FI network, a WWAN, a WPAN such as BLUETOOTH, a WMAN such a WiMAX network, or a cellular network. Alternatively, the network 104 may be a wired network such as, but not limited to, a WAN such as the Internet, a LAN such as the Ethernet, a (PAN), or a MAN.

Once a customer support technician is contacted by a customer inquiring about or reporting a problem with a communication system 156, the technician may utilize the workstation 106 to access and use a consolidated information tool ("CIT") program 126 associated with one or more server computers 110 to assist the technician in answering customer questions regarding the communication system 156 associated with the customer as well as identifying and curing problems affecting the communication system 156 of the customer. Although the description provided herein refers to accessing and providing a consolidated view of information concerning a computing device receiving broadband Internet service such as Digital Subscriber Line ("DSL") service or cable modem service, it should be appreciated that various embodiments of the present invention may be used to access and provide consolidated information regarding any communication, computing, or entertainment device receiving service provided by one or more networks as described above.

As shown in FIG. 1, a network 108 interconnects the workstation 106 and the server computer 110. It should be appreciated that the network 108 may comprise any type of wireless computing network including, but not limited to, a WLAN such as a WI-FI network; a WWAN; a WPAN such as BLUETOOTH; a WMAN such a WiMAX network, or any type of wired computing network including, but not limited to, a WAN such as the Internet; a LAN such as the Ethernet; a PAN; or a MAN. The network 108 provides a medium for enabling communication between the workstation 106, the server computer 110, and other computer systems connected to or accessible through the network 108. In an embodiment of the present invention, the workstation 106 may communicate with the server computer 110 through the network 108 to access and utilize the CIT program 126 stored on the server computer 110, as will be discussed in greater detail below.

In an embodiment of the present invention, the workstation 106 may include a general purpose desktop, laptop, or handheld computer capable of executing one or more application programs. In particular, according to the various embodiments of the present invention, the workstation 106 is operative to execute a web browser application, such as the INTERNET EXPLORER browser from MICROSOFT CORPORATION of Redmond, Wash., from a mass storage device for retrieving, viewing, and interacting with content provided by the server computer 110. In particular, the web browser application of the workstation 106 may be operative to retrieve and view content provided by the CIT program 126 to help answer questions and troubleshoot problems reported by a customer, as discussed in greater detail below.

The workstation 106 may also include a central processing unit ("CPU"), a system memory, including a random access memory ("RAM") and a read-only memory ("ROM"), and a system bus that couples the system memory to the CPU. The workstation 106 may connect to the network 108 through a network interface unit connected to the bus of the workstation. It should be appreciated that the network interface unit may also be utilized to connect to other types of networks and remote computer systems. The workstation 106 may also include an input/output controller for receiving and processing input from a number of other devices, including a keyboard, mouse, scanner, digital computer, or electronic stylus. Similarly, the input/output controller of the workstation 106 may provide output to a display screen, a printer, or other type of output device. It should be understood by those skilled in the art that the CIT program 126 may be stored on and executed from the workstation 106 to assist a technician in answering questions regarding a communication system 156 of a customer and troubleshooting issues affecting the communication system 156.

The server computer 110 may include a standard server computer capable of providing services to other computing systems, such as the workstation 106, over the network 108. The server computer 110 is operative to store and execute a web server application 124, such as the INTERNET INFORMATION SERVER from MICROSOFT CORPORATION. It should be appreciated by those skilled in the art that other web server applications may also be utilized. In an embodiment of the present invention, the web server application 124 may be stored in a mass storage device 122 of the server computer 110. The web server application 124 is operative to execute the CIT program 126, which may also be stored in the mass storage device 122, and receive and respond to requests from computer systems connected to the network 108 for information and services provided by the CIT program described herein.

The server computer 110 may also include a CPU 114, a system memory 116, including a RAM 118 and a ROM 120, and a system bus 128 that couples the system memory and the mass storage device 122 to the CPU. The CPU 114 of the server computer 110 may be a standard central processor that performs arithmetic and logical operations, a more specific purpose programmable logic controller ("PLC"), a programmable gate array, or other type of processor known to those skilled in the art and suitable for controlling the operation of the server computer. CPUs are well-known in the art, and therefore not described in further detail herein. The mass storage device 122 is connected to the CPU 114 through a mass storage controller (not shown) connected to the bus 128. The mass storage device 122 and its associated computer-readable media provide non-volatile storage for the sever computer 110. Although the description of computer-readable media contained herein refers to a mass storage device, such as a hard disk or CD-ROM drive, it should be appreciated by those skilled in the art that computer-readable media can be any available media that can be accessed by the server computer 110.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the server computer 110.

As discussed above and according to various embodiments of the invention, the server computer 110 operates in a networked environment using logical connections to remote computers through the network 108, such as the Internet. The server computer 110 may connect to the network 108 through a network interface unit 112 connected to the bus 128. It should be appreciated that the network interface unit 112 may also be utilized to connect to other types of networks and remote computer systems.

In an embodiment of the present invention, the CIT program 126 communicates with a plurality of information systems located external to the server computer 110 to create a complete and consolidated view of a customer to assist in answering customer questions and diagnosing customer communication system 156 problems. In particular, when a customer contacts a customer support technician at the workstation 106 with a question or communication system 156 problem, the technician may use the workstation to access the CIT program 126 provided by the server computer 110 to receive information regarding the customer and the communication system 156 from one or more information systems 134-154 through the network 108. As will be described in further detail below, the CIT program 126 sends a request to access information regarding a communication system 156 associated with a particular customer through the network 108 to an information service interface 130 which, in an embodiment of the present invention, is operative to provide access to the requested information stored on the systems 134-154. The information service interface 130 may include any application or device capable of receiving a request for information stored on a plurality of disparate systems and providing access to the requested information including, but not limited to, a data abstraction layer or a data warehouse. The CIT program 126 may also communicate with an error log database 132 to send and retrieve information regarding successful technician logins to the CIT program as well as information regarding failed login attempts. It should be appreciated that the error log database 132 and the CIT program 126 may communicate over the network 108, or the error log database may be stored in memory associated with the sever computer 110.

In various embodiments of the present invention, the information systems 134-154 from which requested information is accessed by the CIT program 126 include, but are not limited to, relation databases, mainframe databases, departmental databases, applications, files, web services, and any combination thereof. It should be appreciated that the systems 134-154 utilized by the CIT program 126 may be stored on one or more computing systems similar to the server computer 110. As illustrated in FIG. 1, the systems 134-154 accessed by the CIT program 126 may include, but are not limited to, a Master Customer Database/Call Tracker System ("MCDB/CTS") 134, a Services Outage Notification System ("SONS") 136, a Service Order Entry Gateway ("SOEG") system 138, a Repair system 140 such as the EREPAIR SYSTEM from BELLSOUTH CORPORATION of Atlanta, Ga., a Customer Relationship Management ("CRM") system 142, a Customer Records Information System ("CRIS") 144, an Appointment Database ("ADB") 146, a Usage database 148, a Customer Premise Equipment ("CPE") database 150, a Loop Qualification Service ("LQS") system 152, and a New Product system 154. It should be understood that the information systems 134-154 utilized by the CIT program 126 and described herein are provided by way of illustration only and should not be construed to limit the present invention.

The MCDB/CTS 134 may provide a variety of information about customers including data about services and communication systems, such as the communication system 156, associated with the customer as well as customer billing information. The MCDB/CTS 134 may provide billing information associated with customers for a number of applications, including the CIT program 126, and downstream systems and may be the core component on which critical applications, such as billing and registration, act. In an embodiment of the present invention, the customer billing information provided by the MCDB/CTS 134 may include secondary bill plan information and information regarding any promotions associated with a customer of a communication system 156. For example, the information from the MCDB/CTS 134 may indicate that the customer is utilizing services of the communication system 156 at a promotional rate instead of at a standard rate. The MCDB/CTS 134 may also include a session log summarizing each session between a particular customer and technician using the CIT program 126. As will be discussed in greater detail below in view of FIGS. 3-9, when a customer contacts a technician regarding questions or issues with a communication system 156, the technician may supply information about the session with the customer to a notation template provided by the CIT program 126 which, in turn, may submit all or a portion of the session information from the notation template to the MCDB/CTS 134.

The SONS 136 may provide outage information, if any, associated with a particular communication system 156. In particular, the SONS 136 may provide a consolidated view of outage time, date, duration, and estimated time to repair. The SONS 134 may be used to determine information regarding dial, email, and DSL non-Broadband gateway outages.

Information regarding service order requests associated with a particular customer or communication system 156 may be provided by the SOEG 138. Service requests may be automatically provisioned for service using the SOEG 138. To receive information regarding a service request, the SOEG 138 may provide a service request form to be completed by a customer with information regarding a particular request and then submitted to a service group based on the completed information.

In various embodiments of the present invention, the Repair system 140 provides information about service order tickets and technician dispatches associated with a particular communication system 156 and provides troubleshooting testing of communication systems, such as the communication system 156 to assist in identifying and solving issues with the systems. A service order ticket including information about a customer's service issue may be electronically entered through the repair system 140. The repair system 140 may also provide repairs for issues associated with problematic systems and provide real-time status information regarding all service order tickets.

The CRM system 142 provides detailed customer information such as, but not limited to, identification and contact information of customers, customer type information (e.g., residential or business), and service and customer premise equipment ("CPE") type associated with customers. The CRM system 142 may be accessed by customers and allow customers to enter new service orders, change service orders, and disconnect service orders. The service orders entered through the CRM system 142 may be provided to technicians to allow scheduling of appointments associated with orders received through the CRM system 142. The CRM system 142 may also include a session log including notes taken and results of tests performed during previous sessions with the CIT program 126 regarding the communication system 156.

In an embodiment of the present invention, the CRIS 144 provides customer verification data which the CIT program 126 compares to verification data received from the customer to determine whether to allow a login or email password associated with the communication system 156 of the customer to be reset, an email alias or an email mailbox to be added to the system, or passwords associated with the system to be matched per a request from the customer.

Information regarding appointments associated with a communication system 156 of a customer may be provided by the ADB 146. According to various embodiments of the present invention, an appointment includes a scheduled dispatch of one or more technicians. For example, an appointment may be scheduled to repair issues associated with CPE. The appointment information provided by the ADP 146 may include information identifying a particular appointment of interest, information about the organization handling each appointment associated with a communication system 156, notes provided by a technician during a completed appointment, and scheduling information about when appointments are to occur.

The Usage database 148 provides the CIT program 126 with information illustrating customer usage of a communication system 156, including when a customer is using the communication system 156 as well as how long and how often the customer is using the communication system 156. The usage information may be gathered from a multitude of communication system 156 devices such as, for example, routers, switches, gateways, and servers, and may be used to determine billing for customer use of the communication system 156.

The CPE database 150 may provide information regarding CPE associated with a customer. In an embodiment of the present invention, the information provided by the CPE database 150 includes a log of all or a portion of all CPE associated with a customer, identification information regarding the customer associated with the CPE, and information identifying the CPE. Moreover, if the CPE associated with the customer is a new order, the CPE database 150 may provide status information indicating whether the CPE has shipped; dates of when the CPE was ordered and shipped; destination information indicating where the CPE was shipped; and tracking information to determine a current location of the CPE. The tracking information may be provided to the CPE database 150 by a carrier company handling shipment of the CPE and may be used to access further destination information provided by the carrier company. The CPE database 150 may further include information regarding authorization and processing of CPE returns.

The LQS system 152 provides information indicating whether a communication system 156 associated with a customer supports particular communication services. For example, the LQS system 152 may provide information about the ability of a customer telephone line to support DSL. The information provided by the LQS system 152 may be provided to the SOEG 138 for the initiation and processing of service orders.

Information regarding products and services of a communication system 156 used by a customer but which are not yet accounted for in data associated with a provider may be provided by the New Product system 154. For example, when a product or service is being trialed or when a third party provides the product or service, the provider of the communication system 156 may not have information about the product or service. To retrieve information about such trial or third party products and services associated with the communication system 156 of a customer, the New Product system 154 may contact trial product databases which include information regarding trial and beta products and services and third party databases which include information about products and services provided by a third party through an application programming interface ("API"). The information regarding trial and beta products retrieved from trial product databases and third party databases may include a product name, a product type, an order status, a date when the product was provisioned, activated, terminated and/or downloaded. The New Product system 154 may also provide information regarding secondary billing plans associated with a customer as well as information regarding any promotions associated with the customer or communication system 156 of the customer.

According to embodiments of the present invention, the CIT program 126 may be integrated with collaboration software such as GROOVE VIRTUAL OFFICE software. By using the CIT program 126 in combination with collaboration software, entities located remotely from a technician using a workstation to access the CIT program 126 such as, but not limited to, other technicians, call centers, customers, outside experts, and vendors, may be able to view graphical user interfaces provided by the CIT program 126 via workstations associated with each of the entities. The remotely located entities may be able to discuss and debate issues with the technician accessing the CIT program 126 to assist in providing a consolidated view of a customer and systems associated with a customer.

Figure 2:
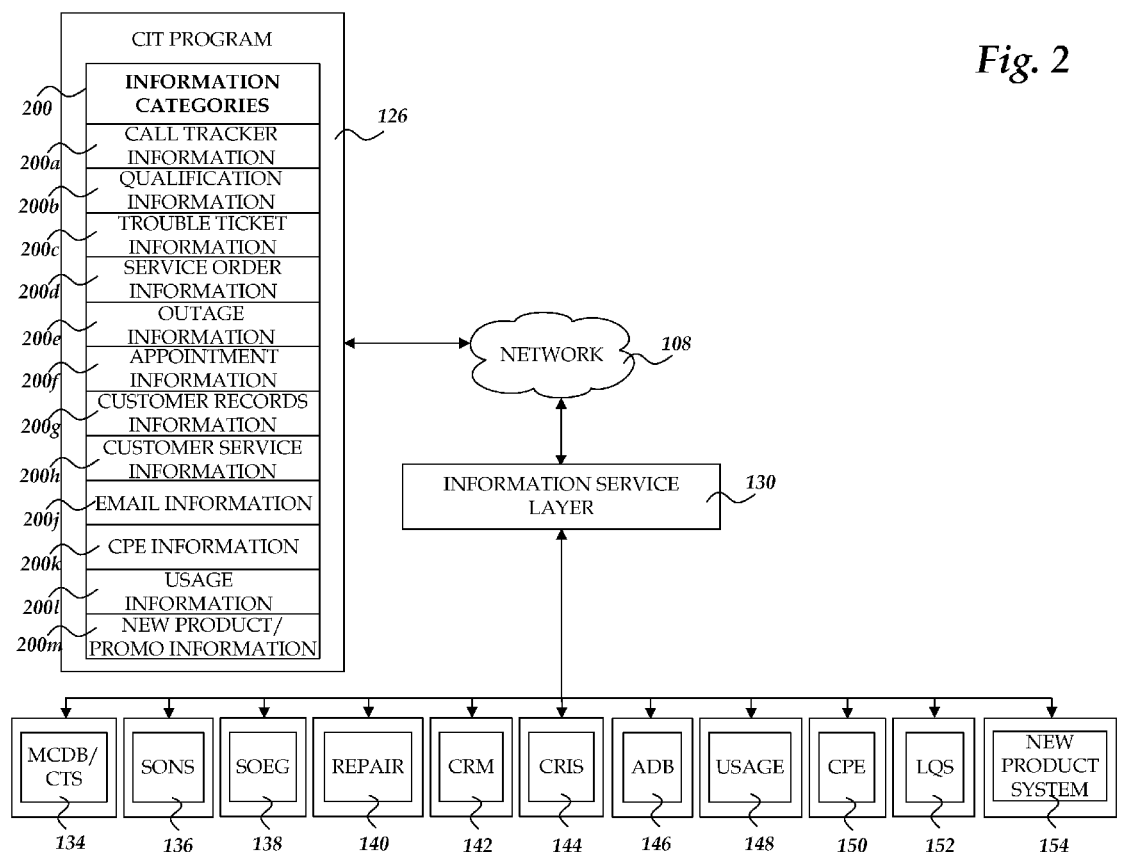
FIG. 2 is a network operating environment illustrating aspects of a consolidated information tool provided in various embodiments of the present invention.
Figure 3:
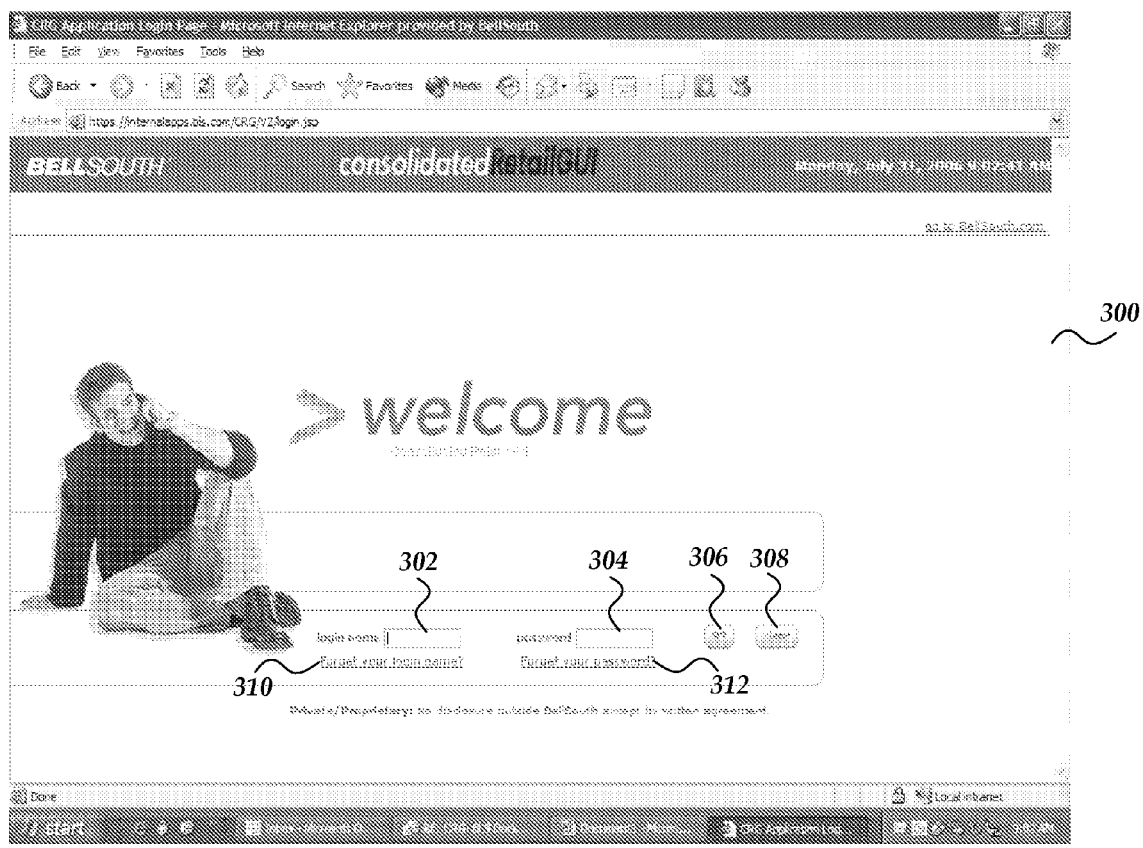
FIGS. 3-9 illustrate graphical user interfaces provided by various embodiments of the present invention.

Referring now to FIG. 2, additional details regarding the CIT program 126 will be described. When a customer contacts a technician regarding questions or issues with a communication system 156, the technician may access the CIT program 126 executed by the server computer 110 and request retrieval of information about the customer and the communication system 156 to assist with the customer questions and issues. Upon receiving a request to retrieve information about a particular customer and/or communication system 156, the CIT program 126 may access an information categories list 200 associated with the program, create one or more requests including one or more information categories 200a-200m of the list based on the request received from the technician, and send the one or more requests to the information service layer 130 for retrieval of the information identified by the one or more information categories from the information systems 134-154. It should be appreciated that the information categories 200a-200m associated with the CIT program 126 and described herein are provided by way of illustration only and should not be construed to limit the present invention.

Each of the information categories 200a-200m may include request information identifying information to be retrieved from the information systems 134-154. The information identified by each of the information categories 200a-200m to be retrieved from the information systems 134-154 may be information most frequently used to assist customers with questions and issues regarding the communication system 156. According to various embodiments of the present invention, the call tracker information category 200a identifies information to be retrieved from the CTS of the MCDB/CTS 134, the qualification information category 200b identifies information to be retrieved from the LQS 152, the trouble ticket information category 200c identifies information to be retrieved from the Repair system 140, the service order information category 200d identifies information to be retrieved from the SOEG system 138, the outage information category identifies information to be retrieved from the SONS 136, the appointment information 200f identifies information to be retrieved from the ADB 146, the customer records information category 200g identifies information to be retrieved from the CRIS 144, the customer service information category 200h identifies information to be retrieved from the CRM 142, the email information category 200j identifies information to be retrieved from the MCDB of the MCDB/CTS 134, the CPE information category 200k identifies information to be retrieved from the CPE database 150, the usage information category 200l identifies information to be retrieved from the Usage database 148, and the new product/promotional information category 200m identifies information to be retrieved from the New Product system 154.

In an embodiment of the present invention, the information categories 200a-200m may also include information identifying which of the information systems to be accessed to retrieve the request information identified by the information category. In a further embodiment, upon receipt of a request provided by the CIT program 126, the information service layer 130 may determine which of the information systems 134-154 to access to retrieve requested information. For example, when the CIT program 126 receives a request for outage information regarding a communication system 156 of a customer, the CIT program may access the information categories list 200, analyze the request to determine one or more information categories 200a-200m of the information category list related to outage information (e.g., the outage information category 200e), and create a request including request information from the outage information category which, in an embodiment of the present invention, includes a request for information identifying all outage occurrences associated with the communication system 156, a start date and estimated time of restoration ("ETR") associated with each outage occurrence, an outage type associated with each occurrence, and an outage status associated with each occurrence.

In an embodiment of the present invention and as will be discussed in greater detail in view of FIGS. 3-9, an initial request received by the CIT program 126 to retrieve information associated with a customer and a communication system 156 may include identification information associated with the customer requesting assistance with a question or problem associated with the communication system 156. The identification information may include a telephone number associated with a customer, an email address associated with a customer, physical address associated with a customer, a username and password associated with a customer, or any other information which uniquely identifies a customer of a communication system 156. In an embodiment of the present invention, upon receiving the initial request, the CIT program 126 may create a request to be sent to the information service layer 130 requesting information identified by each of the information categories 200a-200m to be retrieved from one or more of the information systems 134-154. Once the requested information is received from the one or more information systems 134-154 associated with the information service layer 130, the CIT program 126 may display a portion of the requested information via the workstation 106 and store the remaining portions of the requested information for display upon receiving requests for the remaining portions of the request information. The remaining requested information may be stored in memory associated with the server computer 110 or in memory associated with the information service layer 130. Thus, in response to the initial request, all information identified by the information categories 200a-200m may be retrieved from one or more of the information systems 134-154 and a portion of the retrieved information displayed, while the remaining portions of retrieved information may be stored and then displayed upon specific request.

In a further embodiment of the present invention, upon receiving the initial request, the CIT program 126 may create a request to be sent to the information service layer 130 requesting initial customer information identified by one or more of the information categories 200a-200m to be retrieved from one or more of the information systems 134-154. When the requested information is received from one or more of the information systems 134-154 associated with the information service layer 130, the CIT program 126 may display the requested information. The CIT program 126 may then receive a request for specific information, such as a request for service order information associated with a communication system 156 of a customer. In response, the CIT program 126 may access the information category list 200, analyze the request to determine one or more information categories 200a-200m of the information category list related to service order information (e.g., the service order information category 200d), and create a request including information from the service order information category to be retrieved from one or more of the information systems 134-154. Therefore, in response to the initial request, a portion of information identified by the information categories 200a-200m may be retrieved and displayed, while remaining portions of the information may be retrieved and displayed upon specific request.

Turning now to FIGS. 3-9, graphical user interfaces ("GUIs") provided by the CIT program 126 during a session to assist in answering customer questions and troubleshooting customer issues will be described. It should be appreciated by those skilled in the art that the layout and design of the interfaces as well as the use of radio buttons, slide bars, drop down menu generators, and selection buttons provided by the CIT program 126 and described herein are provided by way of illustration only and should not be construed to limit the present invention. When a technician at the workstation 106 receives a call from a customer having questions regarding a communication system 156 or experiencing a problem with the communication system 156 supported by the technician, the technician may access the CIT program 126 by providing a universal resource locator ("URL") address associated with the CIT program at the workstation. In response, the server computer 110 may execute the CIT program 126 which may provide a login GUI 300 to the workstation through the network 108 for receiving technician or other user verification information, as illustrate in FIG. 3.

In an embodiment of the present invention, the login GUI 300 provides a login name field 302 and a password field 304 for receiving verification information associated with a customer support technician or other user attempting to access the CIT program 126. Upon selection of a go button 306 provided by the login GUI 300, the received verification information may be compared with a list of customer support technicians authorized to access the CIT program 126 to determine whether the received verification information matches one of the authorized technicians. If the received verification information is determined to be valid, then the CIT program 126 may provide a CIT help desk GUI 400 as discussed below in view of FIG. 4A. However, if the received verification information is determined to be invalid, then the CIT program 126 may provide an indication on the login GUI 300 that the verification information has failed as well as a request for the technician or other user to attempt login again. A technician may select a clear button 308 to delete the failed verification information from the login name field 302 and the password field 304 so that further verification information may be provided. As will be discussed in greater detail below, the CIT program 126 may only allow a predetermined number of login attempts by a technician before the technician is locked out of accessing the CIT program. The login GUI 300 may also include a first hyperlink 310 which, when selected, assists a technician who has forgotten his/her login name by sending a copy of the login name to the technician, and a second hyperlink 312 which, when selected, assists a technician who has forgotten his/her password by sending a copy of the password to the technician.

Figure 4A:
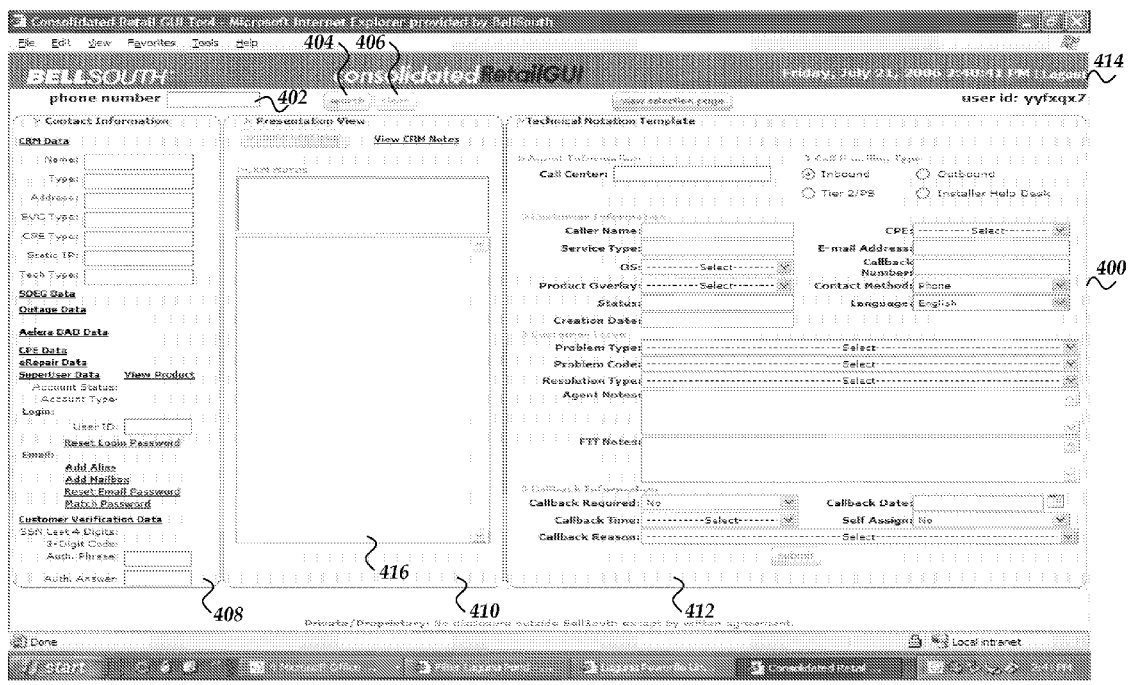

Referring now to FIG. 4A, if the verification information provided by the technician is valid, then the CIT program 126 may provide a CIT help desk GUI 400 having one or more blank fields. In an embodiment of the present invention, the CIT help desk GUI 400 provides an identification field 402 for receiving information identifying a customer reporting a question or problem associated with a communication system 156 and/or information identifying the communication system 156 associated with the customer. The identification information received at the identification field 402 may include a telephone number associated with a customer, an email address associated with a customer, physical address associated with a customer, a username and password associated with a customer, or any other information which uniquely identifies a customer of a communication system 156. The CIT help desk GUI 400 may also provide a search button 404 which, when selected, causes an initial request to retrieve information associated with the identification information received at the identification field 402 to be provided to the CIT program 126. In response to receiving the initial request, the CIT program 126 may retrieve and display all or a portion of the requested information as further described below in view of FIG. 4B. The CIT help desk GUI 400 may also include a clear button 406 which, when selected, deletes all or a portion of all of the information displayed by the CIT help desk GUI and, in an embodiment of the present invention, ends the current CIT session so that requested information associated with another customer and/or communication system 156 may be displayed.

According to various embodiments of the present invention, the CIT help desk GUI 400 further includes a contact information portion 408, a presentation view portion 410, and a technical notation template portion 412, as illustrated in FIG. 4A. The contact information portion 408 may include information fields for displaying information retrieved from one or more of the information systems 134-154 in response to the initial request. In particular, the contact information portion 408 may include a customer name field, customer type field, customer address field, customer service type field, CPE type field, static IP field, and tech type field for displaying information retrieved from the CRM system 142 in response to the initial request. User email identification information from the MCDB/CTS 134 may be displayed in the user identification field of the contact information portion 408 in response to the initial request, and customer verification information from the CRIS 144 may be displayed in the social security number last four digits field, three-digit code field, and authorization phrase and answer fields in response to the initial request.

In an embodiment of the present invention, the contact information portion 408 also includes one or more hyperlinks which, when selected, cause a request for information associated with the hyperlink to be provided to the CIT program 126. In response to receiving the request, the CIT program 126 may retrieve the requested information from one or more of the information systems 134-154 and display the requested information in a display of the presentation view portion 410, as will be discussed in greater detail below. In an embodiment of the present invention, the hyperlinks of the contact information portion 408 include a CRM Data hyperlink, a SOEG Data hyperlink, an Outage Data hyperlink, a DAD Data hyperlink, a CPE Data hyperlink, a Repair Data hyperlink, a View Product hyperlink, a Reset Login Password hyperlink, an Add Alias hyperlink, an Add Mailbox hyperlink, a Reset Email Password hyperlink, and a Match Password hyperlink. It should be appreciated that the hyperlinks and information to be retrieved associated with each of the hyperlinks described herein are provided by way of illustration only and should not be construed to limit the present invention.

The presentation view portion 410 of the CIT help desk GUI 400 may display requested information retrieved from one or more of the information systems 134-154. In an embodiment of the present invention, the information displayed by the presentation view portion 410 changes based on requests received by the CIT program 126. For example, when an initial request generated from receipt of identification information at the identification field 402 and selection of the search button 404 is received by the CIT program 126, the program may access notes provided by the CRM system 142 summarizing previous CIT sessions associated with the received identification information and display the notes in a first display 416 of the presentation view portion 410. When one of the hyperlinks provided by the contact information portion 408, such as the SOEG data hyperlink, is selected, a request for information regarding service order requests associated with a communication system 156 is provided to the CIT program 126. In response, the CIT program 126 may access service order request information provided by the SOEG system 138 and temporarily replace the first display 416 of the presentation view portion 410 including notes provided by the CRM system 142 with a second display 418 including service order request information provided by the SOEG system.

The presentation view portion 410 may also include a view CRM notes hyperlink which, when selected, replaces whatever information is being displayed in the presentation view portion with the first display 416 including session notes provided by the CRM system 142. In an embodiment of the present invention, the presentation view portion 410 may further include a troubleshoot issue button 432 which, when selected, provides a troubleshooting tool to assist in identifying and diagnosing a problem associated with a communication system 156 of a customer, as discussed in greater detail in view of FIG. 4J.

The technical notation template 412 of the CIT help desk GUI 400 may comprise one or more fields for receiving information from one or more of the information systems 134-154 as well as one or more fields for receiving notes from a technician or one or more of the information systems a CIT session regarding a communication system 156. In particular, the technical notation template 412 may include an agent information field for receiving identification information regarding the technician utilizing the CIT program 126 to assist a customer; customer information fields for receiving customer information from the CRM system 142 in response to receipt of an initial request; customer issue fields for receiving input from the technician regarding the types of problems reported by a customer and resolution types associated with the problems, notes provided by the technician during the CIT session, and notes provided by a troubleshooting tool accessed during the CIT session; and callback information fields for receiving information from the technician, if any, regarding contacting a customer after the CIT session. When a CIT session is ended either by selection of the clear button 406 or a logout link 414 provided by the CIT help desk GUI 400, all or a portion of the information displayed in the technical notation template 412 may be provided to one or more of the information systems 134-154 for later retrieval. In an embodiment of the present invention, information displayed in the technical notation template 412 is provided to the CRM system 142 and the MCDB/CTS 134 upon termination of a CIT session.

Figure 4B:
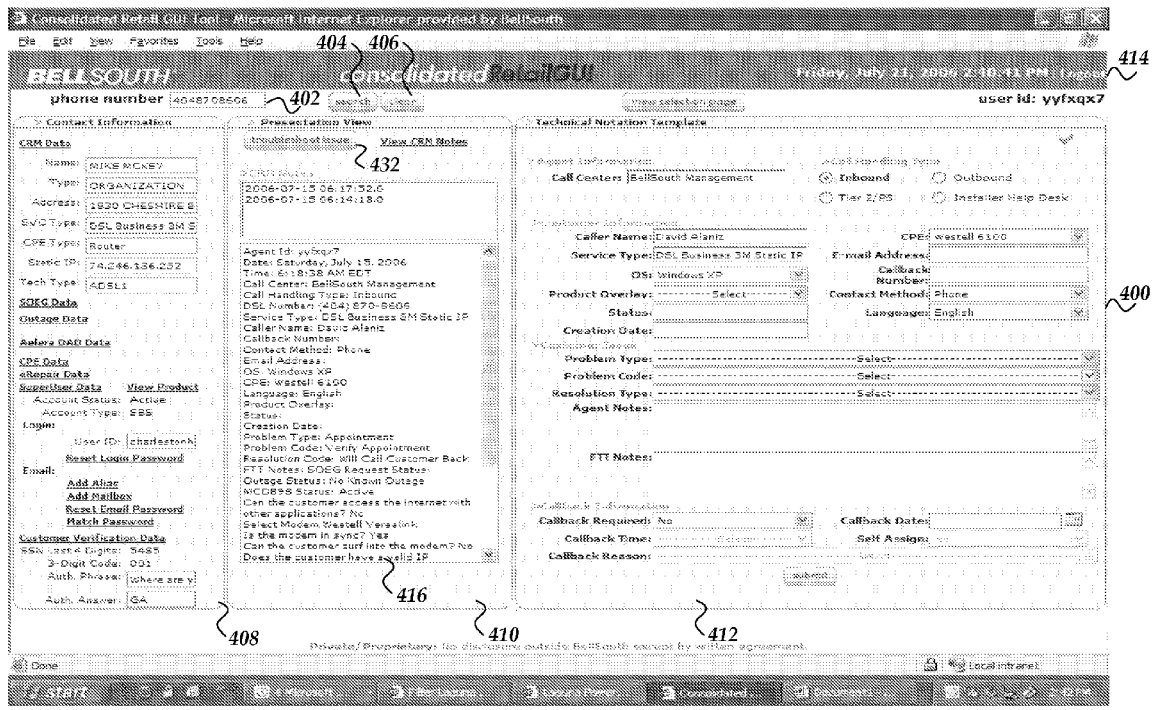

Turning now to FIG. 4B, as discussed above, when identification information is provided at the identification field 402 and the search button 404 is selected, an initial request is provided to the CIT program 126. In response to the initial request, the CIT program 126 may create a request to be sent to the information service layer 130 including the verification information provided by the technician at the login GUI 300 as well as information identified by each of the information categories 200a-200m to be retrieved from one or more of the information systems 134-154 having the requested information. In an embodiment of the present invention, the information service layer 130 validates the verification information with each of the information systems 134-154 having information associated with the request, retrieves the requested information from the information systems, and provides all of the requested information to the CIT program 126 or a portion of the requested information from the CRM system 142, the MCDB/CTS 134, and the CRIS 144 to the CIT program. If all of the requested information is provided to the CIT program 126, the program may display the requested information from the CRM system 142, the MCDB/CTS 134, and the CRIS 144 in response to the initial request and store the remaining portions of the requested information in memory associated with the server computer 110. Alternatively, if only the portion of the requested information from the CRM system 142, the MCDB/CTS 134, and the CRIS 144 is provided to the CIT program 126, then the program may display the requested information from the CRM system, the MCDB/CTS, and the CRIS in response to the initial request, and the remaining portions of the requested information may be stored in memory associated with the information service layer 130 for later retrieval. In either embodiment, the requested information from the CRM system 142, the MCDB/CTS 134, and the CRIS 144 is displayed in the contact information portion 408, the first display 416 of the presentation view portion 410, and the technical notation template 412 of the CIT help desk GUI 400 in response to the initial request, as illustrated in FIG. 4B.

In a further embodiment of the present invention, upon receiving the initial request, the CIT program 126 may create a request to be sent to the information service layer 130 including the verification information provided by the technician at the login GUI 300 as well as information identified by the MCDB/CTS category 200*a*, the customer records information category 200*g*, and the customer service information category 200*h* to be retrieved from the MCDB/CTS 134, the CRIS 144, and the CRM 142, respectively. The information service layer 130 may validate the verification information with the MCDB/CTS 134, the CRIS 144, and the CRM 142, retrieve the requested information from the information systems, and provide the requested information to the CIT program 126 which then displays the requested information in the contact information portion 408, the first display 416 of the presentation view portion 410, and the technical notation template 412 of the CIT help desk GUI 400 in response to the initial request, as shown in FIG. 4B.

Figure 4C:
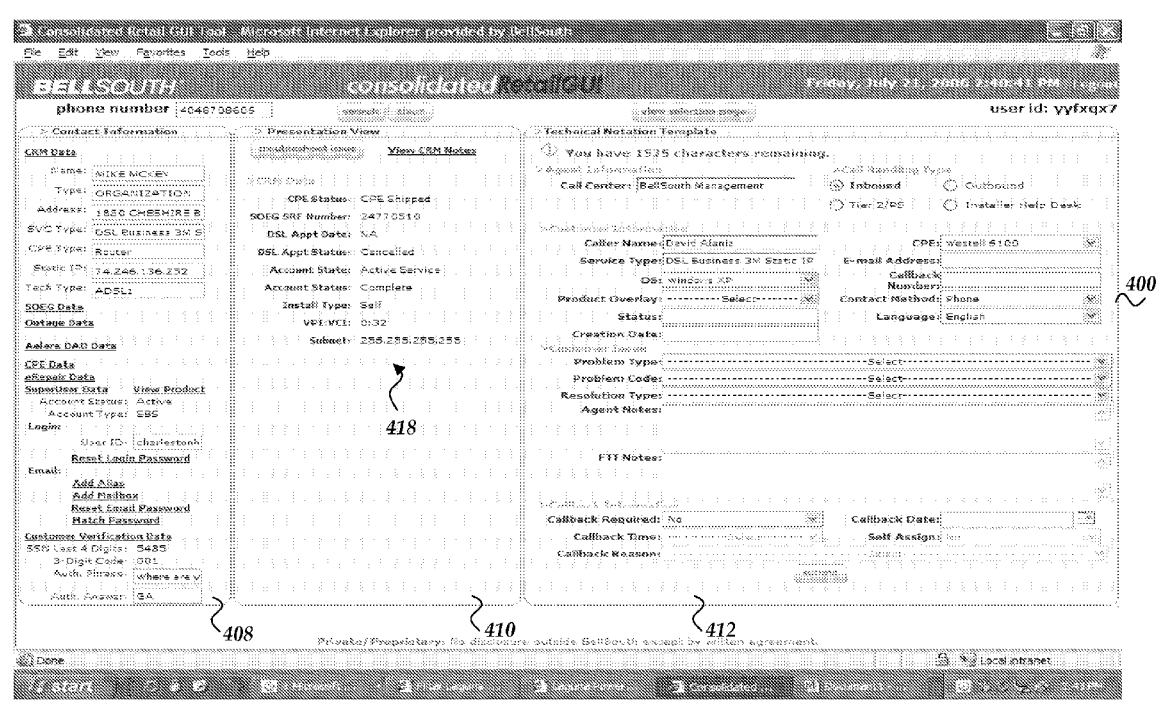

Turning now to FIG. 4C, as noted above, if one of the hyperlinks provided by the contact information portion 408 of the CIT help desk GUI 400 is selected, the first display 416 including information regarding previous CIT sessions associated with the communication system 156 may be temporarily replaced with additional displays of information associated with the selected hyperlink. In particular, as shown in FIG. 4C, when the CRM Data hyperlink of the contact information portion 408 is selected, a request for further customer information is provided to the CIT program 126. If information identified by all of the information categories 200*a*-200*m* was retrieved in response to the initial request and stored in memory associated with either the information service layer 130 or the server computer 110, the CIT program 126 may access the further customer information from the memory and display the further customer information in a second display 418 of the presentation view portion 410 in response to the selection of the CRM data hyperlink, as illustrated in FIG. 4C.

If information identified by all of the information categories 200*a*-200*m* was not retrieved in response to the initial request, then in response to receiving the request for further customer information, the CIT program 126 may access the information categories list 200, analyze the request to determine one or more information categories 200*a*-200*m* of the information category list related to the requested further customer information (e.g., the customer service information category 200*h*), create a request including the verification information provided at the login GUI 300 and information identified by the customer service information category to be retrieved from one or more of the information systems 134-154, and forward the request to the information service layer 130. In an embodiment of the present invention, the information identified by the customer service information category 200*h* to be retrieved includes a request for information identifying status of CPE associated with the customer, a service request form number of a service order request associated with the customer or communication system 156 of the customer, appointment date and status associated with the customer or communication system 156, state and status of an account associated with the customer, installation type associated with the service order request, identification information regarding paths over which data is transported through the communication system 156, and subnet information associated with the communication system 156. The request created by the CIT program 126 may also include information identifying which of the information systems 134-154 should be accessed to retrieve the requested further customer information.

Upon receipt of the request, the information service layer 130 may determine to access the CRM system 142 to retrieve the requested further customer information, retrieve the requested information from the CRM system, and provide the requested information to the CIT program 126. According to various embodiments of the present invention, the CIT program 126 receives the requested further customer information from the information service layer 130 and displays the further customer information in the second display 418 of the presentation view portion 410 in response to the selection of the CRM Data hyperlink, as illustrated in FIG. 4C.

Figure 4D:
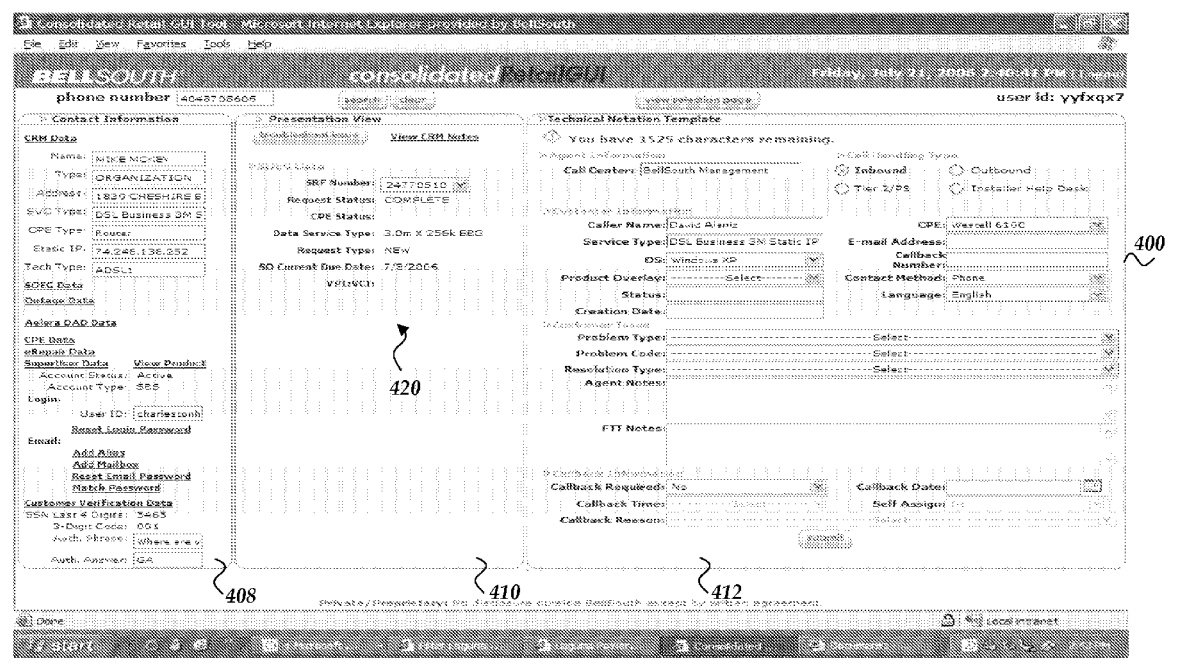

Referring now to FIG. 4D, when the SOEG Data hyperlink of the contact information portion 408 is selected, a request for service order request information associated with a communication system 156 may be provided to the CIT program 126. If information identified by all of the information categories 200*a*-200*m* was retrieved in response to the initial request and stored in memory associated with either the information service layer 130 or the server computer 110, the CIT program 126 may access the service order request information from the memory and display the service order request information in a third display 420 of the presentation view portion 410 in response to the selection of the SOEG Data hyperlink, as illustrated in FIG. 4D.

If information identified by all of the information categories 200*a*-200*m* was not retrieved in response to the initial request, then in response to receiving the request for service order request information, the CIT program 126 may access the information categories list 200, analyze the request to determine one or more information categories 200*a*-200*m* of the information category list related to the requested service order request information (e.g., the service order information category 200*d*), create a request including the verification information provided at the login GUI 300 and information identified by the service order information category to be retrieved from one or more of the information systems 134-154, and forward the request to the information service layer 130. In an embodiment of the present invention, the information identified by the service order information category 200*d* to be retrieved includes a request for all service request form numbers associated with the communication system 156, status information associated with each of the request form numbers, CPE status information associated with each of the request form numbers, data service type information associated with each of the request from numbers, request type information associated with each of the request form numbers, due date information associated with service order of each of the request form numbers, and identification information regarding paths over which data is transported through the communication system 156. The request created by the CIT program 126 may also include information identifying which of the information systems 134-154 should be accessed to retrieve the requested service order request information.

Upon receipt of the request, the information service layer 130 may determine to access the SOEG system 138 to retrieve the requested service order request information, retrieve the requested information from the SOEG system, and provide the requested information to the CIT program 126. According to various embodiments of the present invention, the CIT program 126 receives the requested service order request information from the information service layer 130 and displays the service order request information in the third display 420 of the presentation view portion 410 in response to the selection of the SOEG Data hyperlink, as illustrated in FIG. 4D. The third display 420 may include a drop down menu generator associated with the service request form numbers to select one of the numbers associated with the communication system 156.

Figure 4E:
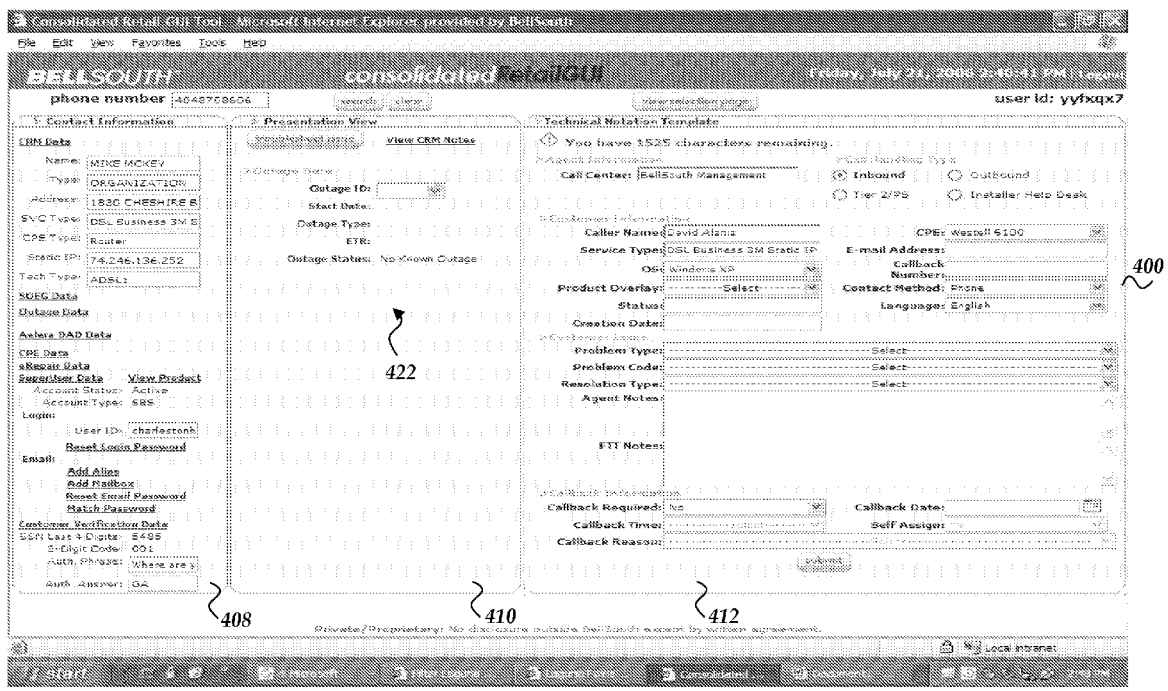

Turning now to FIG. 4E, when the Outage Data hyperlink of the contact information portion 408 is selected, a request for outage information associated with a communication system 156 may be provided to the CIT program 126. If information identified by all of the information categories 200a-200m was retrieved in response to the initial request and stored in memory associated with either the information service layer 130 or the server computer 110, the CIT program 126 may access the outage information from the memory and display the outage information in a fourth display 422 of the presentation view portion 410 in response to the selection of the Outage Data hyperlink, as illustrated in FIG. 4E.

If information identified by all of the information categories 200a-200m was not retrieved in response to the initial request, then in response to receiving the request for outage information associated with the communication system 156, the CIT program 126 may access the information categories list 200, analyze the request to determine one or more information categories 200a-200m of the information category list related to the requested outage information (e.g., the outage information category 200e), create a request including the verification information provided at the login GUI 300 and information identified by the outage information category to be retrieved by one or more of the information systems 134-154, and forward the request to the information service layer 130. In an embodiment of the present invention, the information identified by the outage information category 200e to be retrieved includes a request for all outages associated with the communication system 156, a start date and ETR associated with each outage, outage type information associated with each outage, and outage status information. The request created by the CIT program 126 may also include information identifying which of the information systems 134-154 should be accessed to retrieve the requested outage information.

Upon receipt of the request, the information service layer 130 may determine to access the SONS 136 to retrieve the requested outage information, retrieve the requested information from the SONS system, and provide the requested information to the CIT program 126. According to various embodiments of the present invention, the CIT program 126 receives the requested outage information from the information service layer 130 and displays the outage information in the fourth display 422 of the presentation view portion 410 in response to the selection of the Outage Data hyperlink, as illustrated in FIG. 4E. The fourth display 422 may include a drop down menu generator associated with the identified outages to select one of the outages associated with the communication system 156.

Figure 4F:
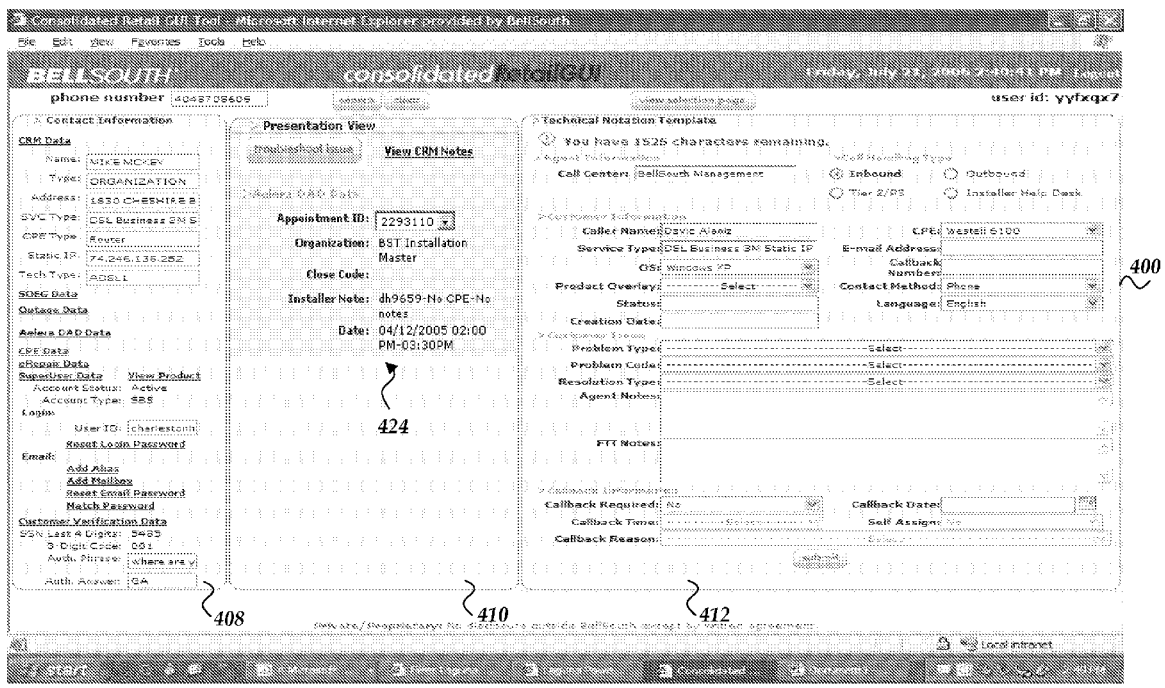

Turning now to FIG. 4F, when the DAD Data hyperlink of the contact information portion 408 is selected, a request for appointment information associated with a communication system 156 may be provided to the CIT program 126. If information identified by all of the information categories 200a-200m was retrieved in response to the initial request and stored in memory associated with either the information service layer 130 or the server computer 110, the CIT program 126 may access the appointment information from the memory and display the appointment information in a fifth display 424 of the presentation view portion 410 in response to the selection of the DAD Data hyperlink, as illustrated in FIG. 4F.

If information identified by all of the information categories 200a-200m was not retrieved in response to the initial request, then in response to receiving the request for appointment information associated with the communication system 156, the CIT program 126 may access the information categories list 200, analyze the request to determine one or more information categories 200a-200m of the information category list related to the requested appointment information (e.g., the appointment information category 200f), create a request including the verification information provided at the login GUI 300 and information identified by the appointment information category to be retrieved from one or more of the information systems 134-154, and forward the request to the information service layer 130. In an embodiment of the present invention, the information identified by the appointment information category 200f to be retrieved includes a request for all appointments associated with a communication system 156 of the customer, information regarding an organization handling each of the appointments, a close code associated with each of the appointments, installer notes associated with each of the appointments, and date and time associated with each of the appointments. The request created by the CIT program 126 may also include information identifying which of the information systems 134-154 should be accessed to retrieve the requested appointment data.

Upon receipt of the request, the information service layer 130 may determine to access the ADB 146 to retrieve the requested appointment information, retrieve the requested information from the ADB, and provide the requested information to the CIT program 126. According to various embodiments of the present invention, the CIT program 126 receives the requested appointment information from the information service layer 130 and displays the appointment information in the fifth display 424 of the presentation view portion 410 in response to the selection of the DAD Data hyperlink, as illustrated in FIG. 4F. The fifth display 424 may include a drop down menu generator associated with the identified appointments to select one of the appointments associated with the communication system 156.

Figure 4G:
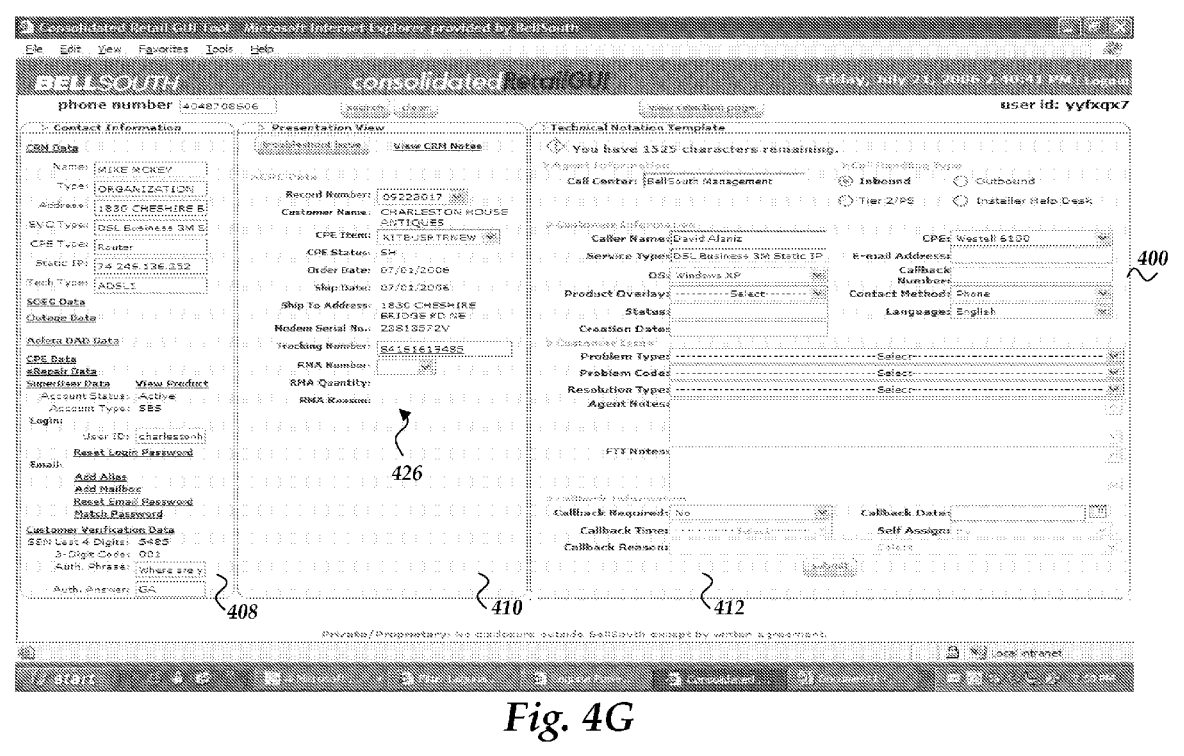

Turning now to FIG. 4G, when the CPE Data hyperlink of the contact information portion 408 is selected, a request for CPE information associated with a customer may be provided to the CIT program 126. If information identified by all of the information categories 200a-200m was retrieved in response to the initial request and stored in memory associated with either the information service layer 130 or the server computer 110, the CIT program 126 may access the CPE information from the memory and display the CPE information in a sixth display 426 of the presentation view portion 410 in response to the selection of the CPE Data hyperlink, as illustrated in FIG. 4G.

If information identified by all of the information categories 200a-200m was not retrieved in response to the initial request, then in response to receiving the request for CPE information associated with the customer, the CIT program 126 may access the information categories list 200, analyze the request to determine one or more information categories 200a-200m of the information category list related to the requested CPE information (e.g., the CPE information category 200k), create a request including the verification information provided at the login GUI 300 and information identified by the CPE information category to be retrieved from one or more of the information systems, and forward the request to the information service layer 130. In an embodiment of the present invention, the information identified by the CPE information category 200k to be retrieved includes a request for a record number associated with each CPE of a customer, customer identification information, information identifying the CPE of a customer, status information regarding the CPE of a customer, order and ship data associated with the CPE, information identifying where the CPE shipped, serial numbers associated with the CPE, tracking information regarding the CPE, and returned merchandise authorization ("RMA") information associated with the CPE. The request created by the CIT program 126 may also include information identifying which of the information systems 134-154 should be accessed to retrieve the requested CPE information.

Upon receipt of the request, the information service layer 130 may determine to access the CPE database 150 to retrieve the requested CPE information, retrieve the requested information from the CPE database, and provide the requested information to the CIT program 126. According to various embodiments of the present invention, the CIT program 126 receives the requested CPE information from the information service layer 130 and displays the CPE information in the sixth display 426 of the presentation view portion 410 in response to selection of the CPE Data hyperlink, as illustrated in FIG. 4G. The sixth display 426 may include a drop down menu generator associated with the record numbers of the CPE of the customer to select one of the record numbers.

Figure 4H:
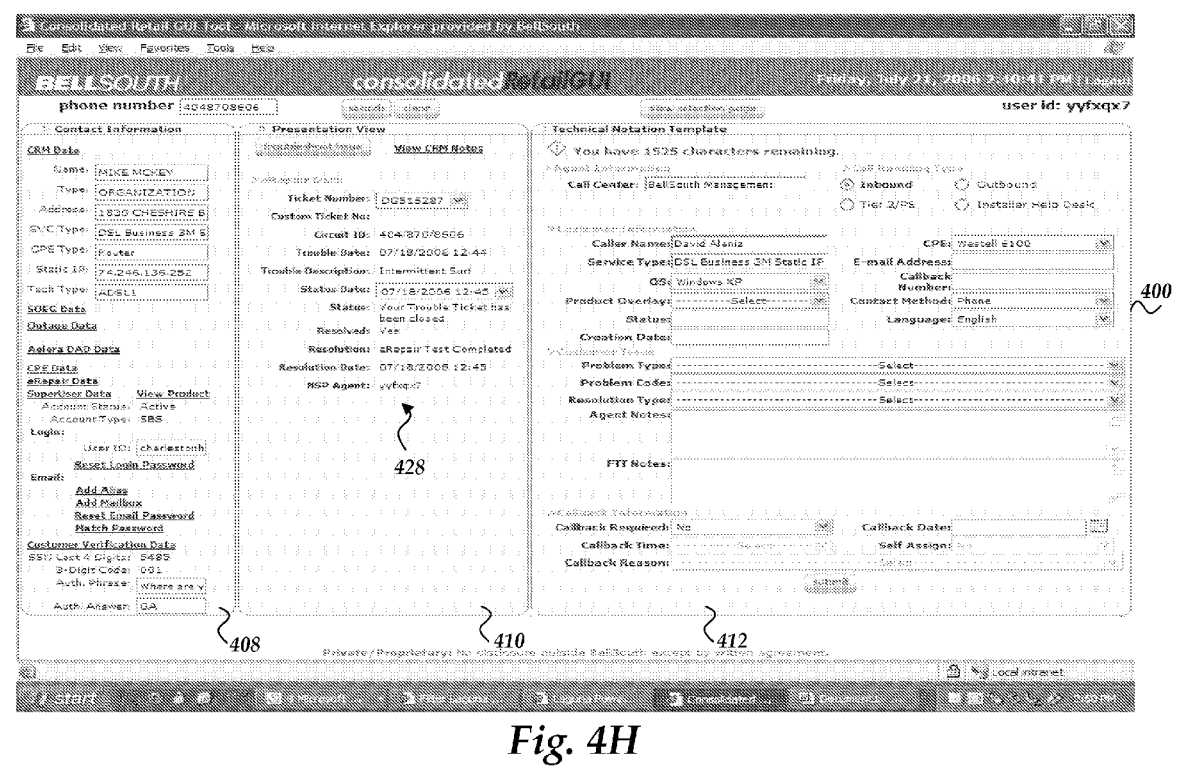

Referring now to FIG. 4H, when the Repair Data hyperlink of the contact information portion 408 is selected, a request for repair information associated with a communication system 156 may be provided to the CIT program 126. If information identified by all of the information categories 200a-200m was retrieved in response to the initial request and stored in memory associated with either the information service layer 130 or the server computer 110, the CIT program 126 may access the repair information from the memory and display the repair information in a seventh display 428 of the presentation view portion 410 in response to the selection of the Repair Data hyperlink, as illustrated in FIG. 4H.

If information identified by all of the information categories 200a-200m was not retrieved in response to the initial request, then in response to receiving the request for repair information associated with the communication system 156, the CIT program 126 may access the information categories list 200, analyze the request to determine one or more information categories 200a-200m of the information category list related to the requested repair information (e.g., the Trouble Ticket information category 200c), create a request including the verification information provided at the login GUI 300 and information identified by the Trouble Ticket information category to be retrieved from one or more of the information systems 134-154, and forward the request to the information service layer 130. In an embodiment of the present invention, the information identified by the Trouble Ticket information category 200c to be retrieved includes a request for all trouble ticket numbers associated with the communication system 156, information identifying an element of the communication system 156 experiencing trouble, date information when trouble reported, description of the reported trouble, status of each trouble ticket and data when status provided, indication whether trouble of each trouble ticket resolved, resolution and date of resolution for each trouble ticket, and agent identification information associated with each trouble ticket. The request created by the CIT program 126 may also include information identifying which of the information systems 134-154 should be accessed to retrieve the requested repair information.

Upon receipt of the request, the information service layer 130 may determine to access the repair system 140 to retrieve the requested repair information, retrieve the requested information from the repair system, and provide the requested information to the CIT program 126. According to various embodiments of the present invention, the CIT program 126 receives the requested repair information from the information service layer 130 and displays the repair information in the seventh display 428 of the presentation view portion 410 in response to the selection of the Repair Data hyperlink, as illustrated in FIG. 4H. The seventh display 428 may include a drop down menu generator associated with the trouble tickets of the communication system 156 to allow selection of one of the trouble tickets.

Figure 4I:
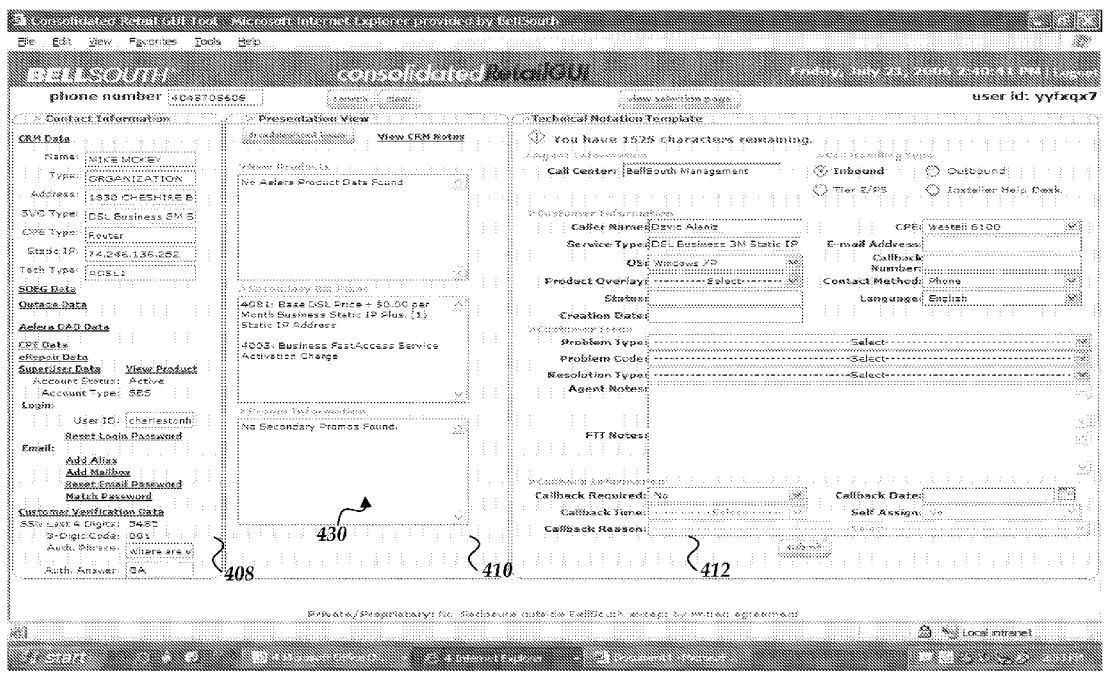

Turning now to FIG. 4I, when the View Product hyperlink of the contact information portion 408 is selected, a request for product and billing information associated with a customer may be provided to the CIT program 126. If information identified by all of the information categories 200a-200m was retrieved in response to the initial request and stored in memory associated with either the information service layer 130 or the server computer 110, the CIT program 126 may access the product and billing information from the memory and display the product and billing information in a eighth display 430 of the presentation view portion 410 in response to the selection of the View Product hyperlink, as illustrated in FIG. 4I.

If information identified by all of the information categories 200a-200m was not retrieved in response to the initial request, then in response to receiving the request for product and billing information associated with the customer, the CIT program 126 may access the information categories list 200, analyze the request to determine one or more information categories 200a-200m of the information category list related to the requested product and billing information (e.g., the new product/promotional information category 200m), create a request including the verification information provided at the login GUI 300 and information identified by the new product/promotional information category to be retrieved from one or more of the information systems 134-154, and forward the request to the information service layer 130. In an embodiment of the present invention, the information identified by the new product/promotional information category 200m to be retrieved includes information regarding any trial or beta test products associated with the customer, secondary billing plan information associated with the customer, and promotional information associated with the customer. The request created by the CIT program 126 may also include information identifying which of the information systems 134-154 should be accessed to retrieve the requested product and billing information.

Upon receipt of the request, the information service layer 130 may determine to access the new product system 154 to retrieve the requested product and billing information, retrieve the requested information from the new product system, and provide the requested information to the CIT program 126. According to various embodiments of the present invention, the CIT program 126 receives the requested product and billing information from the information service layer 130 and displays the product and billing information in the eighth display 430 of the presentation view portion 410 in response to the selection of the View Product hyperlink, as illustrated in FIG. 4I.

Figure 4J:
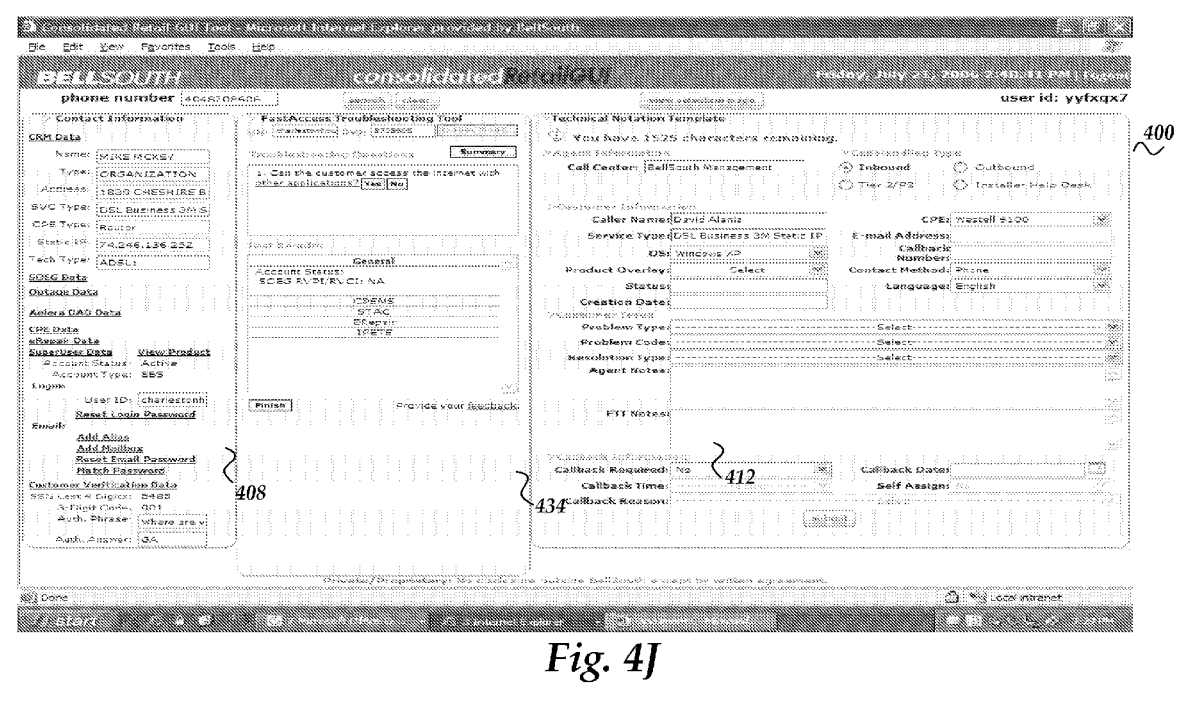

Referring now to FIG. 4J, if the troubleshoot issue button 432 in FIGS. 4B-4I of the presentation view portion 410 is selected, the CIT program 126 may provide a troubleshooting tool to assist in identifying and resolving a problem associated with a communication system 156 of a customer as described in detail in U.S. Ser. No. 11/609,640, entitled "Methods, Systems, and Computer-Readable Media for Assisting in Troubleshooting" filed on Dec. 12, 2006, now abandoned, and which is expressly incorporated herein by reference in its entirety. In response to selection of the troubleshoot issue button 432, the troubleshooting tool of the CIT program 126 may display a troubleshooting tool interface 434 including a troubleshooting question portion for displaying questions based on a troubleshooting methodology associated with the troubleshooting tool to assist in identifying a communication system 156 problem and resolving the problem. The troubleshooting tool interface 434 may also include a testing portion for providing results of tests performed on the communication system 156 based on the troubleshooting methodology as well as a solutions portion for displaying probable solutions to the problem. In an embodiment of the present invention, a technician may include notes regarding information provided by the troubleshooting tool in the customer issue fields of the technical notation template 412. The customer issue fields may also display notes provided by the troubleshooting tool.

Turning now to FIGS. 5-9, GUIs 500-900 provided by the CIT program 126 to assist a customer with resetting passwords, adding alias and mailboxes, and matching passwords associated with a communication system 156 will now be described. If a customer requests that a password associated with a communication system 156 be reset, an alias or mailbox be added, or passwords be matched, a customer support technician may request that the customer provide verification data to determine if the verification information provided by the customer matches the verification information provided by the CRIS 144 and displayed in the customer verification data fields of the contact information portion 408. The technician may require that the verification information provided by the customer match the verification information displayed in the contact information portion 408 before taking action to reset a password, add an alias or mailbox, or match passwords. In an embodiment of the present invention, a request to reset a login password or an email password may be initiated by selection of the Reset Login Password hyperlink or the Reset Email Password hyperlink, respectively, of the contact information portion 408. A request to add an alias or a mailbox may be initiated by selection of the Add Alias hyperlink or the Add Mailbox hyperlink, respectively, of the contact information portion 408, and a request to match passwords may be initiated by selection of the Match Password hyperlink of the contact information portion.

Figure 5:
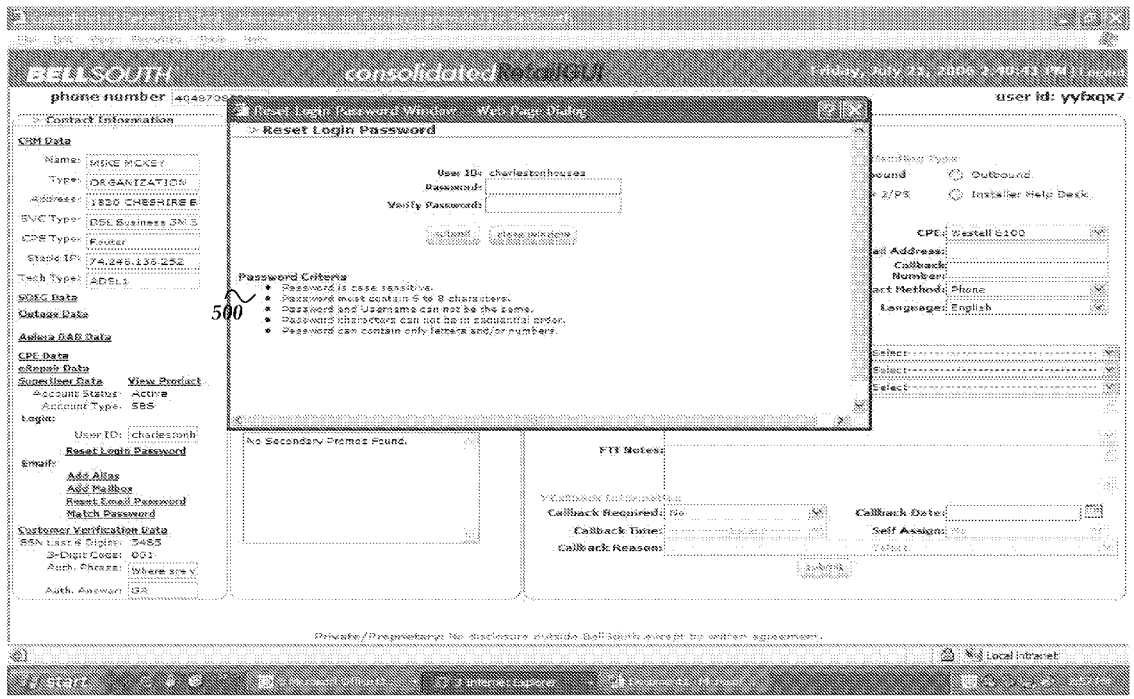

If the verification data matches and the Reset Login Password hyperlink is selected, the CIT program 126 may provide a Reset Login Password interface 500 for changing a password associated with a communication system 156 of the customer. The Reset Login Password interface 500 may provide a password field for receiving submission of a new password and a verify password field for receiving a repeat submission of the new password to verify the new password, as shown in FIG. 5. Once a new password is provided and verified, a submit button provided by the Reset Login Password interface 500 may be selected to reset a login password associated with the communication system 156 to the new password. In an embodiment of the present invention, the Reset Login Password interface 500 provides instructions regarding passwords including, but not limited to, instructions regarding case sensitivity of passwords, required length of passwords, and content of passwords. The Reset Login Password interface 500 may also provide a close window button to close the interface and return to the CIT help desk GUI 400.

Figure 6:
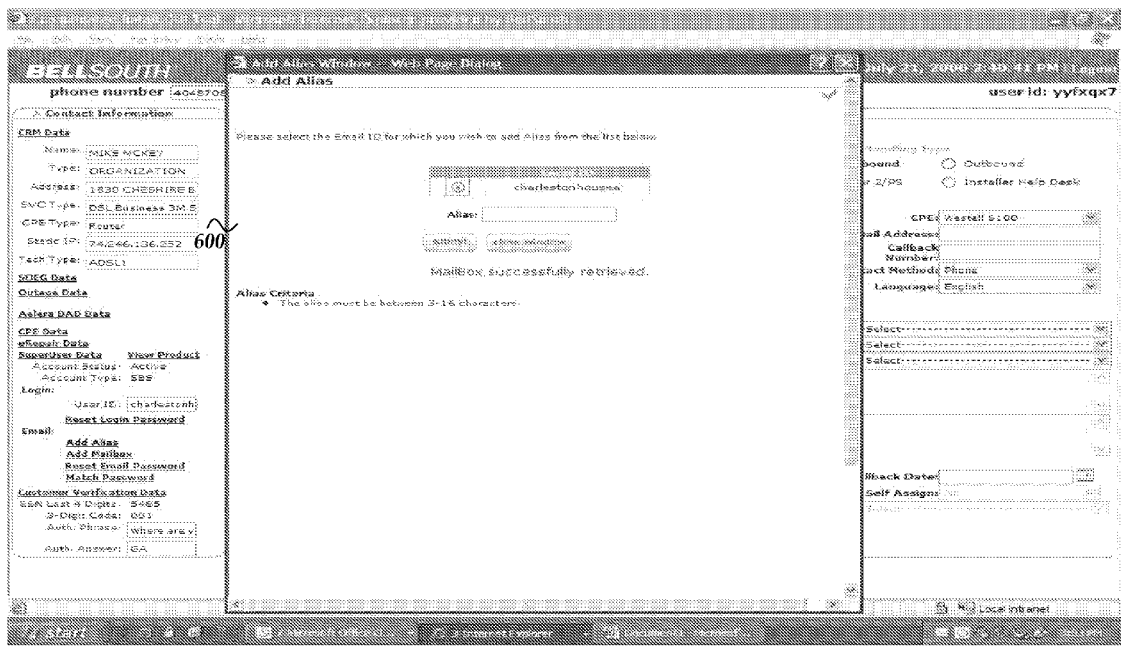

If the verification data matches and the Add Alias hyperlink is selected, the CIT program 126 may provide an Add Alias interface 600 for adding an alias to an existing email account associated with a customer. The Add Alias interface 600 may display a list of email identifiers associated with a customer and an alias field for retrieving an alias to be added, as shown in FIG. 6. Once the email identifier to which the alias is to be added is selected, the alias to be added may be provided in the alias field. The Add Alias interface 600 may also include a submit button for submitting the added alias and a close window button to close the interface and return to the CIT help desk GUI 400. In an embodiment of the present invention, the Add Alias interface 600 further includes criteria regarding an added alias such as, for example, a required length of the alias.

Figure 7:
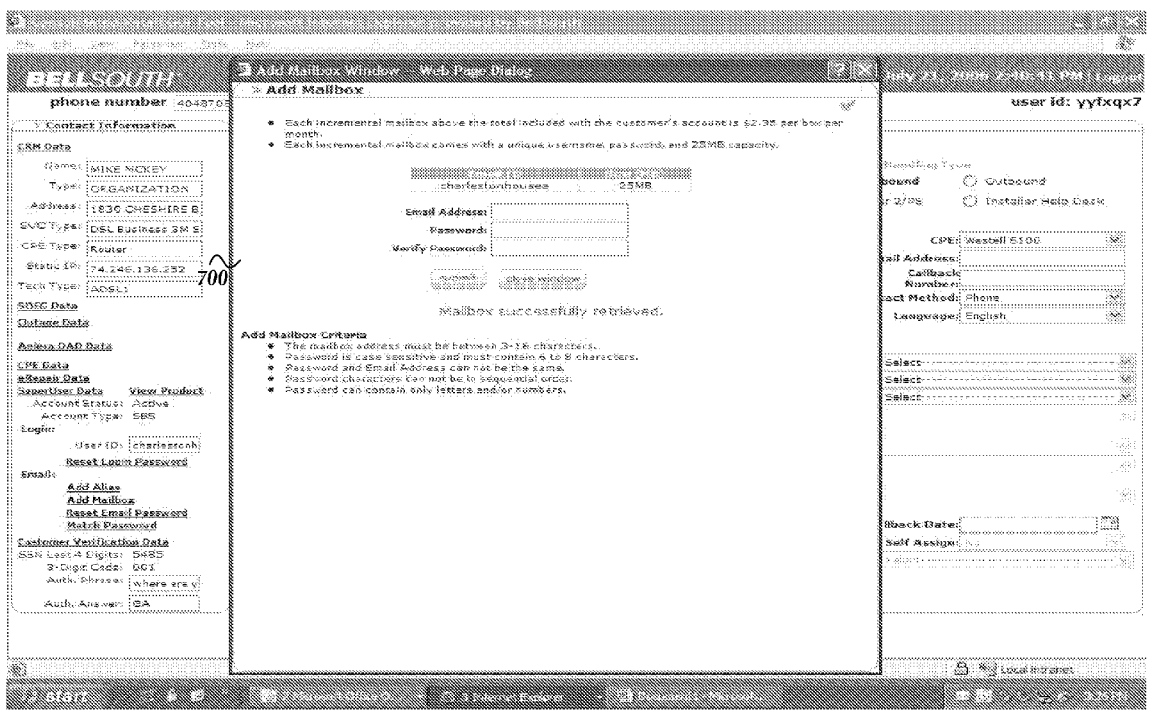

If the verification data matches and the Add Mailbox hyperlink is selected, the CIT program 126 may provide an Add Mailbox interface 700 for adding a mailbox to an account associated with a customer. The Add Mailbox interface 700 may provide a listing of current mailboxes associated with the customer including an email identifier and size associated with each mailbox, as shown in FIG. 7. An email address field for receiving an email address to be associated with an added mailbox, a password field for receiving a password associated with the added mailbox, and a verify password field for receiving a repeat submission of the password associated with the added mailbox to verify the password may also be provided by the Add Mailbox interface 700. The Add Mailbox interface 700 may also include a submit button for submitting the added mailbox information and a close window button to close the interface and return to the CIT help desk GUI 400. In an embodiment of the present invention, the Add Mailbox interface 700 may further provide information regarding the new mailbox including, but not limited to, costs associated with adding a new mailbox, information regarding what is provided when a new mailbox is added, and instructions regarding length requirements for the email address and password, case sensitivity regarding the password, and content of the password.

Figure 8:
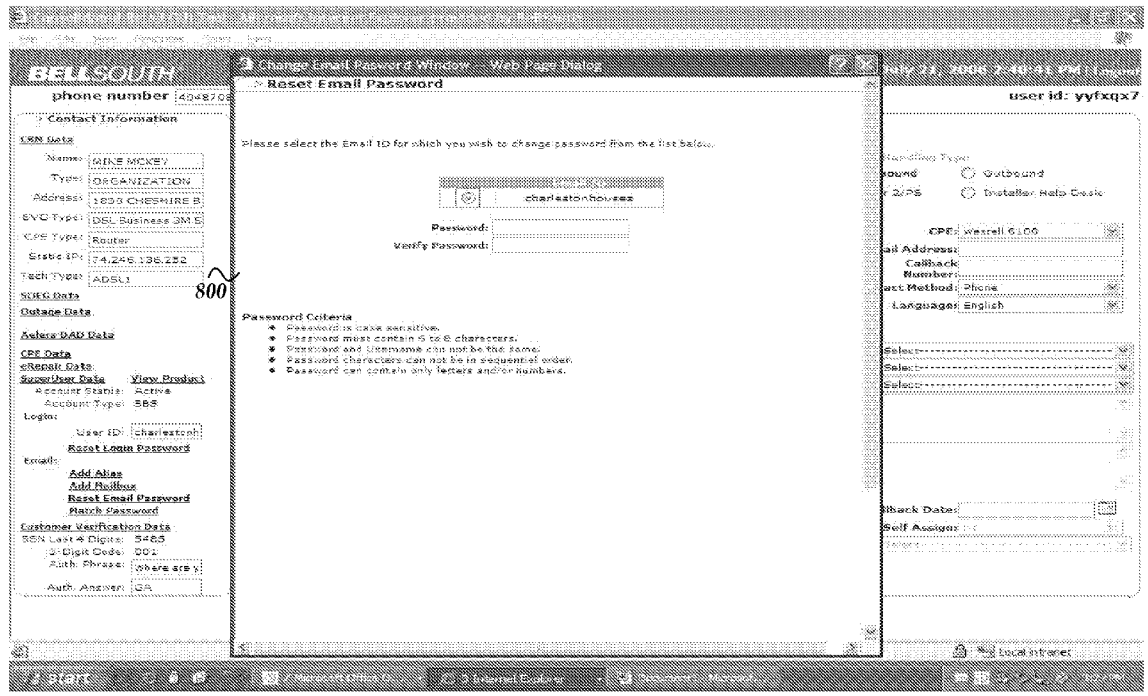
Figure 9:
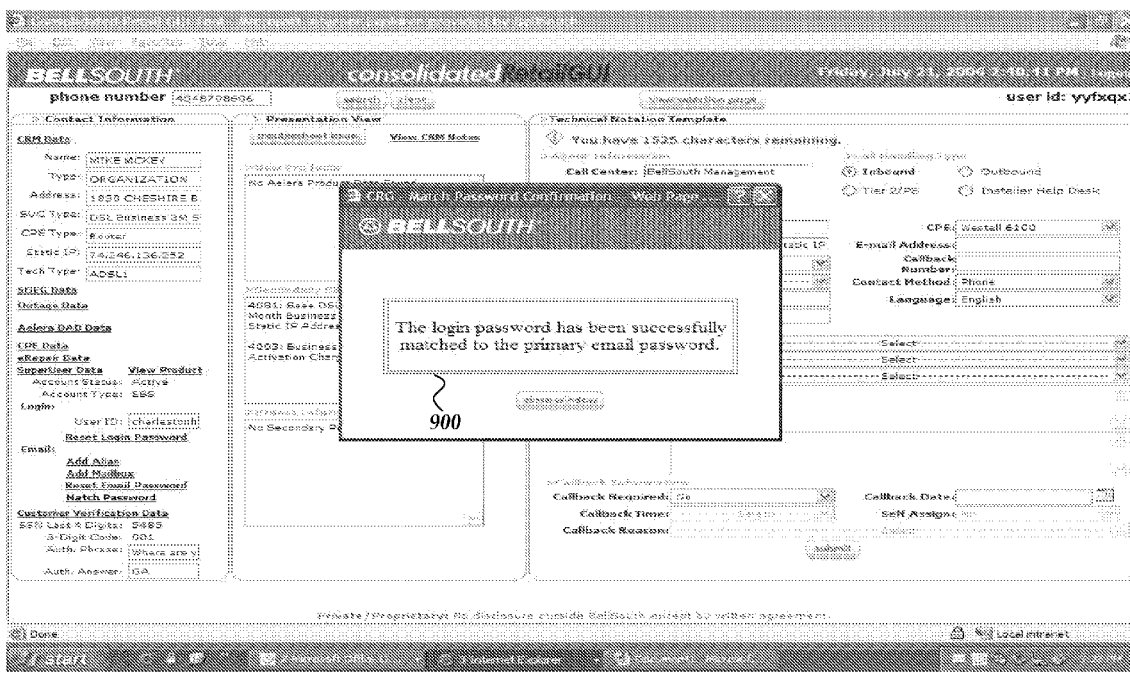

If the verification data matches and the Reset Email Password hyperlink is selected, the CIT program 126 may provide a Reset Email Password interface 800 for resetting an email password associated with an existing email account of a customer. The Reset Email Password interface 800 may display a list of email identifiers associated with a customer, a password field for receiving submission of a new password once one of the email identifiers for which the new password is to be associated is selected from the list of email identifiers, and a verify password field for receiving a repeat submission of the new password to verify the new password, as shown in FIG. 8. Once a new password is provided and verified, a submit button provided by the Reset Email Password interface 800 may be selected to reset an email password associated with the selected email identifier to the new password. In an embodiment of the present invention, the Reset Email Password interface 800 provides instructions regarding passwords including, but not limited to, instructions regarding case sensitivity of passwords, required length of passwords, and content of passwords. The Reset Email Password interface 800 may also provide a close window button to close the interface and return to the CIT help desk GUI 400.

If the verification data matches and the Match Password hyperlink is selected, the CIT program 126 may provide a Match Password Confirmation interface 900 confirming that a login password associated with the communication system 156 of a customer matches a primary email password associated with the customer. The Match Password Confirmation interface 900 may also include a close window button to close the interface and return to the CIT help desk GUI 400.

Figure 10A:
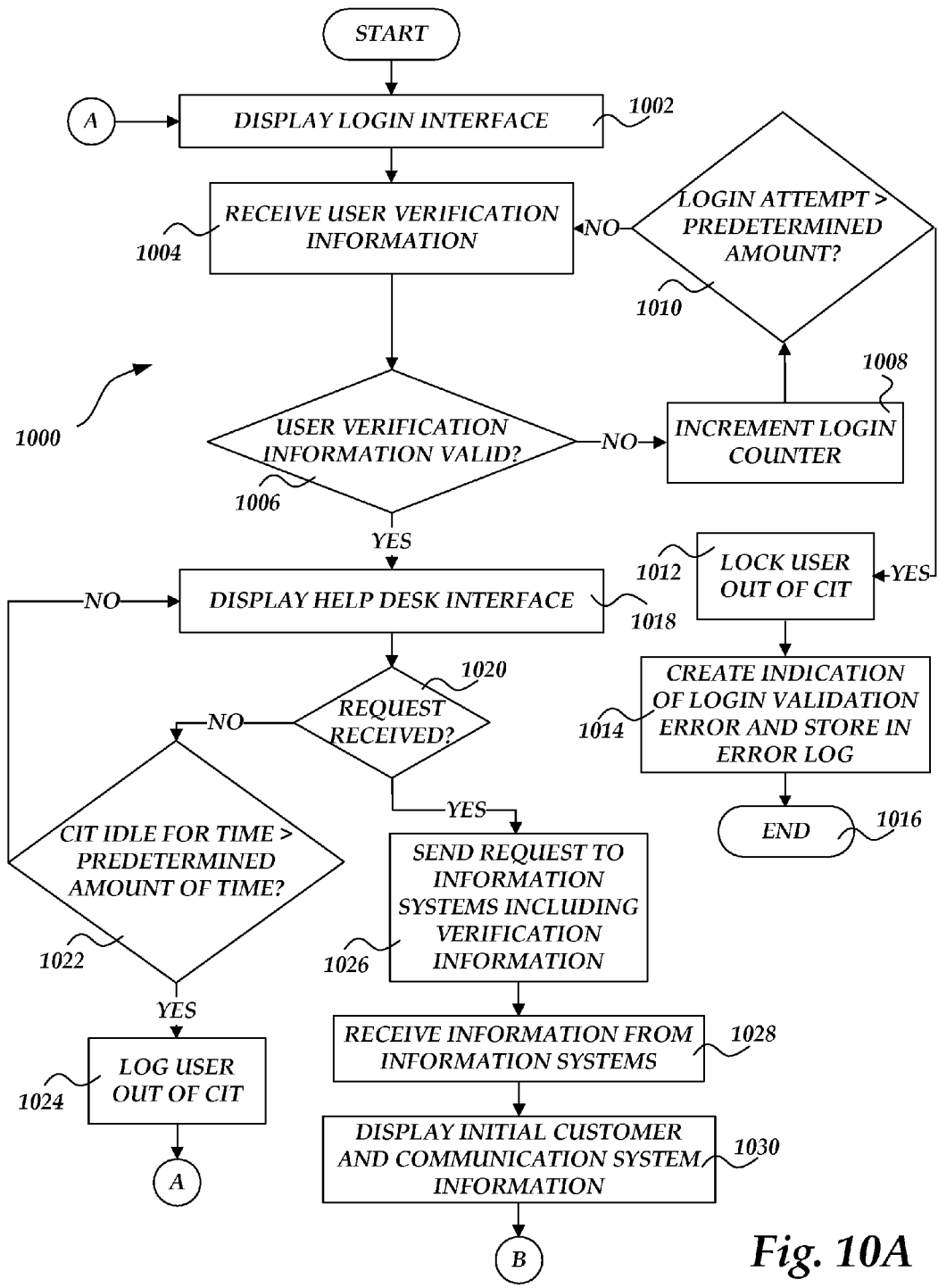
FIGS. 10A-10B are flow diagrams illustrating aspects of a process for accessing information regarding a communication system from a plurality of information sources and providing a consolidated view of the information.
Figure 10B:
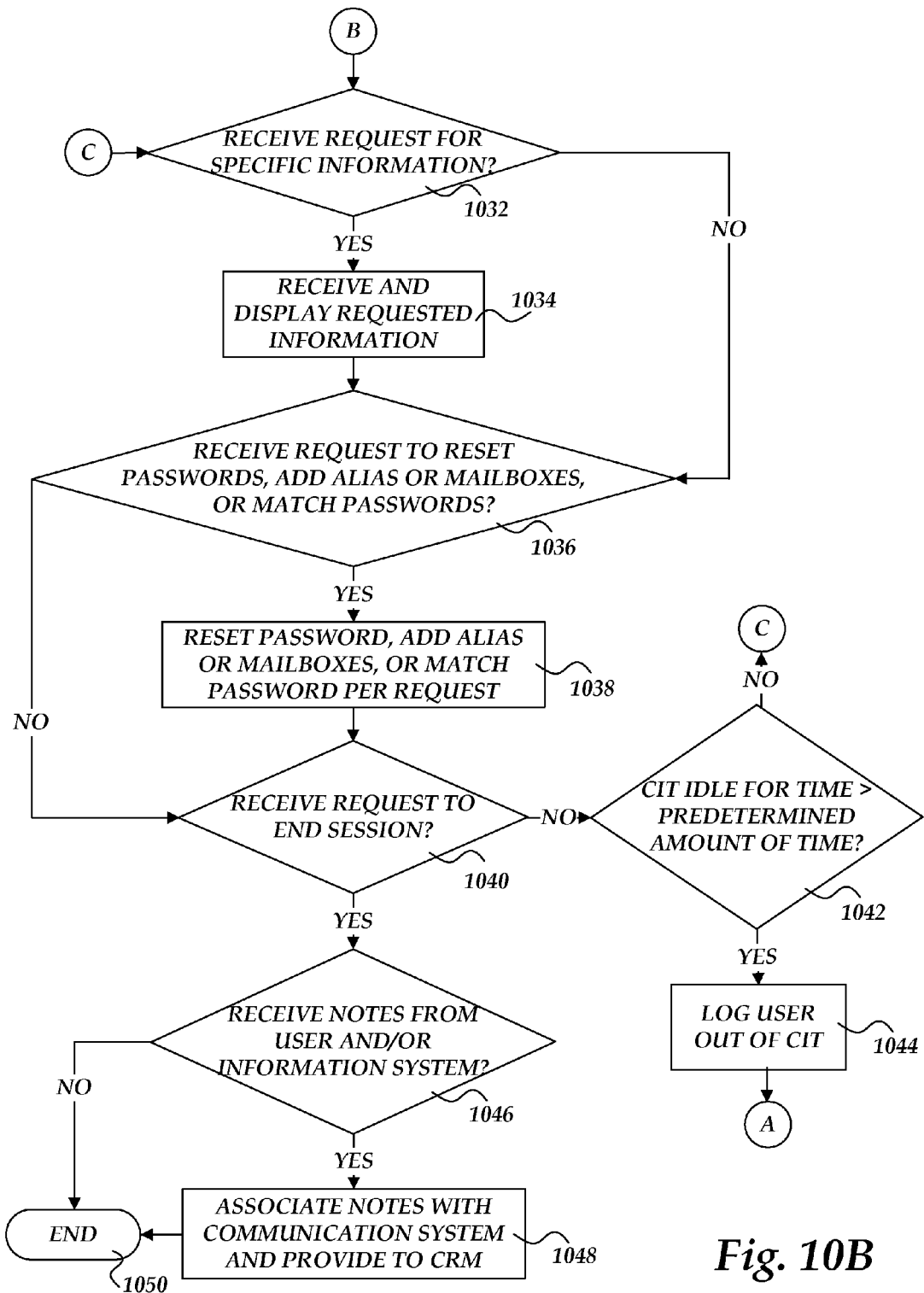

Referring now to FIGS. 10A-10B, further details regarding the operation of the CIT program 126 will be described. In particular, FIGS. 10A-10B illustrate a routine 1000 for accessing information regarding a communication system 156 from a plurality of information sources and providing a consolidated view of the information using the CIT program 126. The routine 1000 begins at operation 1002, where the login GUI 300 of the CIT program 126 is displayed. The routine 1000 proceeds to operation 1004, where verification information from a customer support technician or other user of the CIT program 126 is received at the login name field 302 and the password field 304 of the login GUI 300 and submitted to the program by the selection of the go button 306. From operation 1004, the routine 1000 proceeds to operation 1006, where a determination is made whether the received verification information is valid. As described above, in an embodiment of the present invention, the received verification information may be compared with a list of authorized users of the CIT program 126 to determine whether the received verification information matches one of the authorized users.

If, at operation 1006, a determination is made that the received verification information is not valid, the routine proceeds to operation 1008, where a login counter associated with the CIT program 126 is incremented. From operation 1008, the routine 1000 proceeds to operation 1010, where a determination is made whether the current login attempt is greater than a predetermined amount of login attempts permitted. The login counter may be compared with the predetermined amount of login attempts permitted to determine if the current login attempt is greater than the permitted predetermined amount of login attempts. The predetermined amount of login attempts permitted may be any number. In an embodiment of the present invention, the predetermined amount of login attempts permitted is three.

If, at operation 1010, a determination is made that the current login attempt is not greater than the predetermined amount of login attempts permitted, then the routine 1000 proceeds back to operation 1004, where the login name field 302 and the password field 304 are cleared and verification information from the customer support technician or other user of the CIT program 126 is again received at the login name field and password field and submitted for verification. However, if a determination is made at operation 1010 that the current login attempt is greater than the predetermined amount of login attempts permitted, then the routine 1000 proceeds to operation 1012, where the technician or other user attempting to access the CIT program 126 is locked out of accessing the program. In an embodiment of the present invention, the CIT program 126 may provide a message indicating that the user has been locked out of the program for exceeding the predetermined amount of login attempts allowed. The routine 1000 then proceeds to operation 1014, where an indication of the failed login attempts is created and stored in the error log database 132. The indication may include a date and time associated with the failed login attempts as well as information identifying a workstation where the failed login attempts were performed. From operation 1014, the routine 1000 proceeds to operation 1016, where it ends.

If, back at operation 1006, a determination is made that the received verification information is valid, then the routine 1000 proceeds to operation 1018, where the CIT help desk GUI 400 is displayed. In an embodiment of the present invention, an indication of a valid login is created and stored in the error log database 132. The indication may include a date and time associated with the valid login as well as information identifying a workstation where the valid login was performed. The routine 1000 then proceeds to operation 1020, where a determination is made whether an initial request has been received. As described above, receiving information in the identification information field 402 and selection of the search button 404 of the CIT help desk GUI 400 causes an initial request to retrieve information associated with the received information in the identification information field to be provided to the CIT program 126.

If a determination is made that an initial request to retrieve information has not been received, then the routine 1000 proceeds to operation 1022, where a determination is made whether the CIT program 126 has remained idle for an amount of time greater than a predetermined amount of allowed idle time. The predetermined amount of allowed idle time may be any amount of time. In an embodiment of the present invention, the predetermined amount of allowed idle time is sixty minutes. If a determination is made that the CIT program 126 has remained idle for an amount of time greater than the predetermined amount of allowed idle time, then the routine 1000 proceeds to operation 1024, where the technician or other user of the program is logged out of the program. From operation 1024, the routine 1000 proceeds back to operation 1002, where the login GUI 300 is displayed. On the other hand, if a determination is made that the CIT program 126 has not remained idle for an amount of time greater than the predetermined amount of allowed idle time, then the routine 1000 proceeds back to operation 1018, where the CIT help desk GUI 400 continues to be displayed.

Back at operation 1020, if a determination is made that an initial request for information has been received, then the routine 1000 proceeds to operation 1026, where the CIT program 126 creates a request including the verification information provided by the technician or other user at the login GUI 300 as well as information identified by each of the information categories 200a-200m or a select group of the information categories to be retrieved from the information systems 134-154 and sends the request to the information service layer 130. The routine 1000 then proceeds to operation 1028, where the requested information is received from the information systems 134-154. As discussed above, all of the requested information may be provided to the CIT program 126 in response to the initial request, or a portion of the requested information may be provided to the CIT program and the remaining portions of the requested information stored at the information service layer 130 for later retrieval by the CIT program.

Once the requested information is received at the CIT program 126, the routine 1000 proceeds to operation 1030, where the CIT program displays the requested information. Whether the request created by the CIT program 126 and provided to the information service layer 130 in response to receipt of the initial request included information identified by each of the information categories 200a-200m to be retrieved from the information systems 134-154 or information identified by a select group of the information categories to be retrieved from the information systems, the requested information displayed at operation 1030 may include the portion of the requested information identified by the select group of information categories and retrieved from the respective information systems. In an embodiment of the present invention, the requested information displayed in response to the initial request includes information requested from the CRM system 142, the MCDB/CTS 134, and the CRIS 144.

From operation 1030, the routine proceeds to operation 1032, where a determination is made whether a request for specific information is received at the CIT program 126. As described above, if one of the hyperlinks provided by the contact information portion 408 of the CIT help desk GUI 400 is selected, a request for information associated with the hyperlink is provided to the CIT program 126. If a determination is made that a request for specific information is not received, then the routine 1000 proceeds to operation 1036. On the other hand, if a determination is made that a request for specific information is received, then the routine 1000 proceeds to operation 1034, where the requested specific information is received by the CIT program 126 and displayed in a display of the presentation view portion 410 of the CIT help desk GUI 400. As discussed above, if the initial request included information identified by each of the information categories 200a-200m to be retrieved from the information systems 134-154, the requested information may be stored in either memory associated with the server computer 110 executing the CIT program 126 or in memory associated with the information service layer 130. In response to the request for specific information, the CIT program 126 may retrieve the requested specific information associated with the selected hyperlink from either the memory associated with the server computer 110 or the memory associated with the information service layer 130 and display the requested specific information.

On the other hand, if the initial request included information identified by a select group of the information categories 200a-200m, then in response to the request for specific information, the CIT program 126 may access the information categories list 200, analyze the request for specific information to determine one or more information categories 200a-200m of the information category list related to the requested specific information, create a request including the verification information provided at the login GUI 300 and information identified by the one or more information categories associated with the specific information to be retrieved from one or more of the information systems 134-154, and forward the request to the information service layer 130. Upon receipt of the request from the CIT program 126, the information service layer 130 may determine to access one or more of the information systems 134-154 associated with the selected information category to retrieve the requested specific information and provide the requested specific information to the CIT program 126 for display. From operation 1034, the routine 1000 proceeds to operation 1036.

At operation 1036, a determination is made whether a request to reset a login or email password, add an alias or mailbox, or match passwords has been received by the CIT program 126. As discussed above, in an embodiment of the present invention, a request to reset a login password or an email password may be initiated by selection of the Reset Login Password hyperlink or the Reset Email Password hyperlink, respectively, of the contact information portion 408. A request to add an alias or a mailbox may be initiated by selection of the Add Alias hyperlink or the Add Mailbox hyperlink, respectively, of the contact information portion 408, and a request to match passwords may be initiated by selection of the Match Password hyperlink of the contact information portion. A technician or other user of the CIT program 126 may require a customer to supply valid customer verification information prior to taking action to request that a password be reset, an alias or mailbox be added, or passwords be matched.

If a determination is made that a request to reset a password, add an alias or mailbox, or match passwords is not received, then the routine 1000 proceeds to operation 1040. On the other hand, if a determination is made that a request to reset a password, add an alias or mailbox, or match passwords is received, then the routine 1000 proceeds to operation 1038, where the password is reset, alias or mailbox added, or passwords matched per the request. The routine 1000 then proceeds to operation 1040.

At operation 1040, a determination is made whether a request to end the CIT session has been received. In an embodiment of the present invention, if a technician or other user of the CIT program 126 selects the clear button 406 or the logout link 414 of the CIT help desk GUI 400, a request is provided to the CIT program to end the session, and in response, the program terminates the session. If a determination is made that a request to end the CIT session is not received, then the routine 1000 proceeds to operation 1042, where a determination is made whether the CIT program 126 has remained idle for an amount of time greater than a predetermined amount of allowed idle time. If a determination is made that the CIT program 126 has remained idle for an amount of time greater than the predetermined amount of allowed idle time, then the routine 1000 proceeds to operation 1044, where the technician or other user of the program is logged out of the program. From operation 1044, the routine 1000 proceeds back to operation 1002, where the login GUI 300 is displayed. On the other hand, if a determination is made that the CIT program 126 has not remained idle for an amount of time greater than the predetermined amount of allowed idle time, then the routine 1000 proceeds back to operation 1032, where a determination is made whether a request for specific information is received at the CIT program 126.

If a determination is made at operation 1040 that a request to end the CIT session has been received, then the routine 1000 proceeds to operation 1046, where a determination is made whether notes from the technician or other user of the CIT program 126 or from one or more of the information systems 134-154 were received during the CIT session. As discussed above, notes from the technician or other users of the CIT program 126 and/or notes provided by one or more of the information systems 134-154 may be provided in the customer issue portion of the technical notation template 412. If a determination is made that notes were received during the CIT session, then the routine 1000 proceeds to operation 1048, where the notes are associated with the customer and/or communication system 156 of the CIT session and provided to one or more of the information system 134-154. In an embodiment of the present invention, the notes are sent by the CIT program 126 to the CRM system 142 and the MCDB/CTS 134 so that the CIT program may access the notes from the CRM system and the MCDB/CTS upon initiation of a new CIT session regarding the communication system 156. From operation 1048, the routine 1000 proceeds to operation 1050, where it ends. If a determination is made at operation 1046 that no notes from the technician or other user of the CIT program or from one or more of the information systems 134-154 were received during the CIT session, then the routine 1000 proceeds to operation 1050, where it ends.

It will be appreciated that embodiments of the present invention provide methods, systems, apparatus, and computer-readable media for accessing information regarding a communication system from a plurality of information sources and providing a consolidated view of the information. Although the invention has been described in language specific to computer structural features, methodological acts, and by computer readable media, it is to be understood that the invention defined in the appended claims is not necessarily limited to the specific structures, acts, or media described. Therefore, the specific structural features, acts, and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for providing information regarding a communication system, the method comprising:
   receiving, at a processor, a first request to access information regarding the communication system;
   in response to receiving the first request:
      retrieving, by the processor, the information regarding the communication system from a plurality of information systems, and
      displaying, by the processor, a first portion of the information retrieved from a first information system of the plurality of information systems, the first portion of the information retrieved from the first information system of the plurality of information systems including notes associated with a previous retrieval of information regarding the communication system;
   receiving, at the processor, a second request to access a second portion of the information retrieved from a second information system of the plurality of information systems, the second portion of the information retrieved from the second information system including promotional information comprising a promotional rate associated with using the communication system; and
   in response to receiving the second request, displaying, by the processor, the second portion of the information retrieved from the second information system of the plurality of information systems.

2. The method of claim 1, wherein the first request to access information regarding the communication system includes information identifying a customer associated with the communication system.

3. The method of claim 1, further comprising:
   prior to receiving the first request to access information regarding the communication system, receiving verification information validating access to information regarding communication systems; and
   prior to retrieving the information regarding the communication system from the plurality of information systems, providing a request to access the information regarding the communication system to each of the plurality of information systems, the request including the verification information to validate retrieval of the information regarding the communication system from the plurality of information systems.

4. The method of claim 1, wherein the first portion of the information retrieved from the first information system includes information regarding a customer associated with the communication network.

5. The method of claim 1, wherein remaining portions of the information regarding the communication system retrieved from remaining information systems of the plurality of information systems include at least one of outage information associated with the communication system, service order information associated with the communication system, appointment information associated with the communication system, or troubleshooting information associated with the communication system.

6. The method of claim 1, further comprising receiving notes about the information regarding the communication system retrieved from the plurality of information systems.

7. The method of claim 1, wherein the second portion of the information regarding the communication system retrieved from the second information system of the plurality of information systems further includes information about devices being trialed by a customer of the communication system.

8. A computer-readable medium having computer-executable instructions stored thereon which, when executed by a computer, cause the computer to:
   receive a first request to access information regarding the communication system;
   in response to receiving the first request:
      retrieve a first portion of the information regarding the communication system from a first information system, and
      display the first portion of the information retrieved from the first information system, the first portion of the information retrieved from the first information system including notes associated with a previous retrieval of information regarding the communication system;
   receive a second request to access a second portion of the information regarding the communication system, the second portion of the information including promotional information comprising a promotional rate associated with using the communication system; and
   in response to receiving the second request:
      retrieve the second portion of the information regarding the communication system from a second information system, and
      display the second portion of the information retrieved from the second information system.

9. The computer-readable medium of claim 8, wherein the first request to access information regarding the communication system includes information identifying a customer associated with the communication system.

10. The computer-readable medium of claim 8, comprising further computer-readable instructions which, when executed by the computer, cause the computer to:
   prior to receiving the first request to access information regarding the communication system, receive verification information validating access to information regarding communication systems;
   prior to retrieving the first portion of the information regarding the communication system from the first information system, provide a request to access the first portion of the information regarding the communication system to the first information system, the request including the verification information to validate retrieval of the first portion of the information regarding the communication system from the first information system; and prior to retrieving the second portion of the information regarding the communication system from the second information system, provide a request to access the second portion of the information regarding the communication system to the second information system, the request including the verification information to validate retrieval of the second portion of the information regarding the communication system from the second information system.

11. The computer-readable medium of claim 8, wherein the first portion of the information retrieved from the first information system includes data regarding a customer associated with the communication network.

12. The computer-readable medium of claim 8, comprising further computer-readable instructions which, when executed by the computer, cause the computer to receive notes about the first portion of the information regarding the communication system retrieved from the first information system and the second portion of the information regarding the communication system retrieved from the second information system.

13. A system for providing information regarding a communication system, the system comprising:

a memory device for storing a program for assisting in providing information regarding a communication system; and a processor, functionally coupled to the memory device, the processor being responsive to computer-executable instructions contained in the program and operative to:

receive a first request to access information regarding the communication system;

in response to receiving the first request:

retrieve the information regarding the communication system from a plurality of information systems, and display a first portion of the information retrieved from a first information system of the plurality of information systems, the first portion of the information retrieved from the first information system of the plurality of information systems including notes associated with a previous retrieval of information regarding the communication system;

receive a second request to access a second portion of the information retrieved from a second information system of the plurality of information systems, the second portion of the information retrieved from the second information system including promotional information comprising a promotional rate associated with using the communication system; and in response to receiving the second request, display the second portion of the information retrieved from the second information system of the plurality of information systems.

14. The system of claim 13, wherein the processor is further operative to:

prior to receiving the first request to access information regarding the communication system, receive verification information validating access to information regarding communication systems; and prior to retrieving the information regarding the communication system from the plurality of information systems, provide a request to access the information regarding the communication system to each of the plurality of information systems, the request including the verification information to validate retrieval of the information regarding the communication system from the plurality of information systems.

15. The system of claim 13, wherein remaining portions of the information regarding the communication system retrieved from remaining information systems of the plurality of information systems include at least one of outage information associated with the communication system, service order information associated with the communication system, appointment information associated with the communication system, and troubleshooting information associated with the communication system.

16. The system of claim 13, wherein the processor is further operative to:

receive notes about the information regarding the communication system retrieved from the plurality of information systems.

17. The system of claim 13, wherein the second portion of the information regarding the communication system retrieved from the second information system of the plurality of information systems further includes information about beta devices being used by a customer of the communication system.

* * * * *